United States Patent [19]
Takano et al.

[11] Patent Number: 5,790,874
[45] Date of Patent: Aug. 4, 1998

[54] INFORMATION PROCESSING APPARATUS FOR REDUCING POWER CONSUMPTION BY MINIMIZING HAMMING DISTANCE BETWEEN CONSECUTIVE INSTRUCTION

[75] Inventors: Hiroyuki Takano; Nobuhiro Ide; Takeshi Yoshida, all of Kanagawa-ken, Japan

[73] Assignee: Kabushiki Kaisha Toshiba, Kawasaki, Japan

[21] Appl. No.: 536,180

[22] Filed: Sep. 29, 1995

[30] Foreign Application Priority Data

Sep. 30, 1994 [JP] Japan .................. 6-237680
Sep. 30, 1994 [JP] Japan .................. 6-261394

[51] Int. Cl.⁶ ........................................ G06F 1/32
[52] U.S. Cl. ........................ 395/750.03; 395/598
[58] Field of Search ............................ 395/709, 750, 395/598, 750.03; 364/707

[56] References Cited

U.S. PATENT DOCUMENTS

| | | | |
|---|---|---|---|
| 3,478,322 | 11/1969 | Evans ........................... | 395/598 |
| 3,792,441 | 2/1974 | Wymore et al. ................ | 395/598 |
| 4,204,252 | 5/1980 | Hitz et al. ...................... | 395/598 |
| 5,274,829 | 12/1993 | Hotta et al. .................... | 395/598 |

OTHER PUBLICATIONS

Su et al., Saving Power in the Control Path of Embedded Processors, IEEE Design & Test of Computers, pp. 24–30, Winter 1994.

Printout from Instn. Electrical Engineers substantiating dates for IEEE articles authored by Su et al.

Su et al., "Low Power Architecture Design and Compilation Techniques for High-Performance Processors", *IEEE*, pp. 489–498, (1994).

*Primary Examiner*—Richard L. Ellis
*Attorney, Agent, or Firm*—Foley & Lardner

[57] ABSTRACT

An instruction sequence optimization apparatus optimizes programs used in an information processing system that includes a program memory for storing programs, and a processing unit for fetching the programs from the program memory via an instruction bus. The apparatus includes an instruction sequence analyzing unit for analyzing mutual dependence relations between respective instructions constituting the program, and an instruction sequence modifying unit for modifying sequences of the instructions insofar as the mutual dependence relations analyzed by the instruction sequence analyzing unit are not influenced, to thus reduce Hamming distances between bit sequences appearing on the instruction bus when the instructions are transferred from the program memory to the processing unit.

16 Claims, 33 Drawing Sheets

FIG.5

```
/* Sample Program */
#include    <stdio.h>
#define     MAX 100
main ( )
{
    int     i , q , z[MAX] , x[MAX];
    for (i=0;i< MAX; i++)    q=q+z[i] * x[i];
    printf("Q=Q+Z[i]xX[i]:%d¥n",   q);
}
```

FIG.6

```
*********************************************************
Line No  Address    object Code      Assembley Source
*********************************************************
  1                                  LL0:
  2                                    . seg  "data"
  3                                    . seg  "text"
  4                                    . proc  04
  5                                    . global _main
  6                                  _main:
  7                                  !#PROLOGUE# 0
  8      00000000   033fffff           sethi  %hi(LF25). %gl      ......C101  ⎫
  9      00000004   82006078           add    %gl. %lo(LF25). %gl ...C102     ⎬ B1
 10      00000008   9de38001           save   %sp. %gl. %sp       ......C103  ⎪
 11                                  !#PROLOGUE# 1                             ⎭
 12      0000000c   c027bffc           st     %go. [%fp+-0x4]     ........C104
 13                                  L29:
 14      00000010   d007bffc           ld     [%fp+-0x4] ,%oo     ......C201  ⎫
 15      00000014   80a22064           cmp    %o0, 0x64          ........C202 ⎬ B2
 16      00000018   16800014           bge    L28                ............C203 ⎪
 17      0000001c   01000000           nop                       ............C204 ⎭
```

FIG.7

| | | | | |
|---|---|---|---|---|
| 18 | 00000020 | 9027a198 | sub | %fp, 0x198, %o0 ···C301 |
| 19 | 00000024 | d207bffc | ld | [%fp+-0x4], %o1 ···C302 |
| 20 | 00000028 | 952a6002 | sll | %o1, 0x2, %o2 ······C303 |
| 21 | 0000002c | d002000a | ld | [%o0f%o2], %o0 ·····C304 |
| 22 | 00000030 | 9627a328 | sub | %fp, 0x328, %o3······C305 |
| 23 | 00000034 | d807bffc | ld | [%fp+-0x4], %o4······C306 |
| 24 | 00000038 | 9b2b2002 | sll | %o4, 0x2, %o5········C307 |
| 25 | 0000003c | d202c00d | ld | [%o3+ %o5], %o1 ···C308 |
| 26 | 00000040 | 40000000 | call | . mul, 2 ················C309 |
| 27 | 00000044 | 01000000 | nop | ························C310 |
| 28 | 00000048 | de07bff8 | ld | [%fp+-0x8], %o7······C311 |
| 29 | 0000004c | a003c008 | add | %o7, %o0, %l0 ······C312 |
| 30 | 00000050 | e027bff8 | st | %l0, [%fp+-0x8] ······C313 |
| 31 | | | L27: | |
| 32 | 00000054 | e207bffc | ld | [%fp+-0x4], %l1 |

B3 brackets lines 18–30. B4 brackets line 32.

FIG. 8

|    |            |          |        |                        |     |
|----|------------|----------|--------|------------------------|-----|
| 33 | 00000058   | a2046001 | add    | %l1, 0x1, %l1          | ⎫   |
| 34 | 0000005c   | e227bffc | st     | %l1, [%fp+-0x4]        | ⎬ B4 |
| 35 | 00000060   | 10bffeec | b      | L29                    |     |
| 36 | 00000064   | 01000000 | nop    |                        | ⎭   |
| 37 |            |          | L28:   |                        |     |
| 38 |            |          | .seg   | "data1"                |     |
| 39 |            |          |        | "Q = Q + Z[i] × X[i] :"|     |
| 40 |            |          | .ascii |                        |     |
| "%d¥012¥0" |   |          |        |                        |     |
| 41 | 00000068   | 11000000 | .seg   | "text"                 | ⎫   |
| 42 | 0000006c   | 90122000 | set    | L31, %o0               |     |
| 42 | 00000070   | d207bff8 | ld     | [%fp+-0x8], %o1        | ⎬ B5 |
| 43 | 00000074   | 40000000 | call   | _printf, 2             |     |
| 44 | 00000078   | 01000000 | nop    |                        |     |
| 45 | 0000007c   | 90102000 | mov    | 0, %o0                 | ⎭   |
| 46 |            |          |        |                        |     |

FIG.9

```
47
48   00000080    b0100008
49   00000084    81c7e008
50   00000088    81e80000
51                           LE25:
52                                   mov      %o0. %i0
53                                   ret
54                                   restore
55                                   LF25 = -904
56                                   LP25 = 96
                                     LT25 = 96
                              . Seg  "data"
```

```
******************** LABEL LIST ****************************
 1        LL0            0
 6       _main           0
13        L29           10
31        L27           54
37        L28           68
39        L31            0
47       LE25           80      ⎫
51       LE25      ffffffc78    ⎬ B6
52       LE25           60      ⎭
```

LABEL:
| | | | | | |
|---|---|---|---|---|---|
| 0000 | Set 0x00101 r4 | 1100101011 | 00100 | 0000000001000 | 00001 |
| 0001 | Set 0x00215 r5 | 1011010000 | 00101 | 0000000010000 | 10101 |
| 0010 | Set 0x00112 r6 | 1011010000 | 00101 | 0000000001000 | 10010 |
| 0011 | ld [r5+0x4] r1 | 1100000001 | 00001 | 00101 0000000 | 00100 |
| 0100 | ld [r6+0x4] r2 | 1100101011 | 00010 | 00110 0000000 | 00100 |
| 0101 | mul r1 r2 rlc | 1100101011 | <u>11100</u> | 00001 0000000 | 00010 |
| 0110 | add r2 r4 r3 | 1100101011 | 00011 | 00010 0000000 | 00100 |
| 0111 | sub rlc r3 rlc | 1100011011 | <u>11100</u> | 00011 0000000 | <u>11100</u> |
| 1000 | cmp rlc 0x4c | 1011010000 | <u>11100</u> | 00000 0001000 | 01100 |
| 1001 | bnc LABEL | 0100000010 | 00000 | 11111 1111111 | 11100 |
| 1010 | nop | 0000000000 | 00000 | 00000 0000000 | 00000 |
| 1011 | ld [r5+0x20] r1 | 1100000001 | 00001 | 00101 0000001 | 00000 |
| 1100 | ld [r6+0x20] r2 | 1100000001 | 00010 | 00110 0000001 | 00000 |
| 1101 | mul r1 r2 rlc | 1100101011 | <u>11100</u> | 00001 0000000 | 00010 |
| 1110 | st [r6+0x28] rlc | 1100100111 | <u>11100</u> | 00100 0000001 | 01000 |

FIG.20B

LABEL:
| | | | | | |
|---|---|---|---|---|---|
| 0000 | Set 0x00101 r4 | 1100101011 | 00100 | 0000000001000 | 00001 |
| 0001 | Set 0x00215 r5 | 1011010000 | 00101 | 0000000010000 | 10101 |
| 0010 | Set 0x00112 r6 | 1011010000 | 00101 | 0000000001000 | 10010 |
| 0011 | ld [r5+0x4] r1 | 1100000001 | 00001 | 00101 0000000 | 00100 |
| 0100 | ld [r6+0x4] r2 | 1100101011 | 00010 | 00110 0000000 | 00100 |
| 0101 | mul r1 r2 rlc | 1100101011 | <u>00000</u> | 00001 0000000 | 00010 |
| 0110 | add r2 r4 r3 | 1100101011 | 00011 | 00010 0000000 | 00100 |
| 0111 | sub r0 r3 r0 | 1100011011 | <u>00000</u> | 00011 0000000 | <u>00000</u> |
| 1000 | cmp r0 0x4c | 1011010000 | <u>00000</u> | 00000 0001000 | 01100 |
| 1001 | bnc LABEL | 0100000010 | 00000 | 11111 1111111 | 11100 |
| 1010 | nop | 0000000000 | 00000 | 00000 0000000 | 00000 |
| 1011 | ld [r5+0x20] r1 | 1100000001 | 00001 | 00101 0000001 | 00000 |
| 1100 | ld [r6+0x20] r2 | 1100000001 | 00010 | 00110 0000001 | 00000 |
| 1101 | mul r1 r2 rlc | 1100101011 | <u>11100</u> | 00001 0000000 | 00010 |

(NOT MODIFIED BECAUSE THIS IS OUT OF AVAILABLE RANGE)

| | | | | | |
|---|---|---|---|---|---|
| 1110 | st [r6+0x28] rlc | 1100100111 | <u>11100</u> | 00100 0000001 | 01000 |

FIG.21

| REGISTER NUMBER | START ADDRESS | END ADDRESS |
| --- | --- | --- |
| 0x01 | 0011 | 0101 |
| 0x02 | 0100 | 0110 |
| 0x03 | 0110 | 0111 |
| 0x04 | 0000 | 0110 |
| 0x05 | 0001 | 1011 |
| 0x06 | 0010 | 1100 |
| 0x1c | 0101 | 1000 |
| 0x01 | 1011 | 1101 |
| 0x02 | 1100 | 1101 |
| 0x1c | 1101 | 1110 |

FIG.23

| | |
|---|---|
| div r13, r16, r11 | 010111 10001 10011 000 11110101 10110 |
| add r11, r5, r17 | <u>111111</u> 10111 10001 010 00000000 00101 |
| div r17, r14, r14 | 010111 10101 10011 000 11110101 10111 |
| add r11, r5, r17 | <u>000000</u> 10111 10001 010 00000000 00101 |
| mul r17, r14, r14 | 010010 10101 10011 000 11110101 10111 |

FIG.25A

| | |
|---|---|
| mul r13, r16, r11 | 010010 10001 10011 000 11110101 10110 |
| addi r11, r5, r17 | 010000 10111 10001 010 0000000000101 |
| mul r17, r14, r14 | 010010 10101 10011 000 11110101 10111 |

FIG.25B

| | |
|---|---|
| mul r13, r16, r11 | 010010 10001 10011 000 11110101 10110 |
| subi r11, r5, r17 | 010001 10111 10001 010 1111111111011 |
| mul r17, r14, r14 | 010010 10101 10011 000 11110101 10111 |

FIG.28A

```
(0)  _main:
(1)          or     %g0,0,%o5
(2)  LABEL1:
(3)          smul   %o4,%o5,%o4
(4)          add    %o3,8,%o3
(5)          xor    %o4,1,%o3
(6)          and    %o4,%o3,%o4
(7)          add    %o5,1,%o5
(8)          subcc  %o5,10,%o4
(9)          bl     LABEL1
(10)         add    %o4,10,%o4
(11)         sub    %o5,%o4,%o5
(12)         sdiv   %o5,%o4,%o4
(13)         add    %o4,10,%o5
(14)         jmpl   %o7+8,%g0
(15)         add    %g0,%o5,%o0
```

FIG.28B

| ROW NUMBER | op | op3 |
|---|---|---|
| (1) | 10 | 000010 |
| (3) | 10 | 001011 |
| (4) | 10 | 000000 |
| (5) | 10 | 000011 |
| (6) | 10 | 000001 |
| (7) | 10 | 000000 |
| (8) | 10 | 010100 |
| (9) | 00 | - |
| (10) | 10 | 000000 |
| (11) | 10 | 000100 |
| (12) | 10 | 001111 |
| (13) | 10 | 000000 |
| (14) | 10 | 111000 |
| (15) | 10 | 000000 |

FIG.30

| COMBINATION OF INSTRUCTIONS | APPEARING TIMES |
|---|---|
| or - smul | 1 |
| add - smul | 19 |
| add - xor | 10 |
| add - and | 10 |
| add - subcc | 10 |
| add - sub | 1 |
| add - sdiv | 1 |
| add - jmpl | 2 |
| xor - and | 10 |
| sub - sdiv | 1 |

| INSTRUCTION | BIT PATTERN |
|---|---|
| add | 000000 |
| sub | 000001 |
| subcc | 000010 |
| or | 010001 |
| and | 000100 |
| xor | 001000 |
| smul | 010000 |
| sdiv | 000011 |
| jmpl | 100000 |

INFORMATION PROCESSING APPARATUS FOR REDUCING POWER CONSUMPTION BY MINIMIZING HAMMING DISTANCE BETWEEN CONSECUTIVE INSTRUCTION

BACKGROUND OF THE INVENTION

1. Field of the Invention

The present invention relates to an information processing apparatus having a processor which executes instructions in accordance with control signals generated correspondingly to input bit patterns and, more particularly, an information apparatus permitting a reduction in power consumption according to applications which are being executed.

2. Description of the Prior Art

With the development of multimedia in recent years, portable information processing apparatuses such as a book computer, a notebook computer, a portable phone, and the like are in widespread use.

In FIG. 1, a structure of a control section of such portable type information processing apparatus is exemplified schematically. In a CPU (Central Processing Unit) 101 shown in FIG. 1, an execution unit 103 executes respective instructions constituting a control program. An input/output section 105 outputs addresses of instructions executed by the execution unit 103 sequentially to an address bus 109, and fetches instructions corresponding to the addresses from an instruction bus 111. A register section 113 stores temporarily data produced when the execution unit 103 executes the instructions.

In a program memory 115, respective instructions constituting a control program are stored in a memory section 117 in advance. An input/output section 119 reads from the memory section 117 respective instructions corresponding to addresses input from the address bus 109, and outputs them to the instruction bus 111.

When controls are effected by the CPU 101 in such construction, first the addresses of instructions executed by the execution unit 103 are sent from the input/output section 105 of the CPU 101 to the input/output section 119 of the program memory 115 via the address bus 109. Thus, the program memory 115 reads the instructions based on the designated address, and outputs them from the input/output section 119. The input/output section 105 of the CPU 101 receives the instructions via the instruction bus 111 and then sends them to the execution unit 103. The execution unit 103 executes the instructions to thus effect control of the information processing apparatus.

If data to be stored temporarily are generated while the execution unit 103 is executing the instructions as above, the data are stored in the register section 113 in the CPU 101, and are read out therefrom when required.

Meanwhile, the control program used in the information processing apparatus shown in FIG. 1 is previously prepared, and installed in the program memory 115 when the information processing apparatus is assembled. Upon developing the control program, various optimization techniques are carried out in the means for forming an object program (i.e., a program stored in the program memory 115) by conducting compilation of high-class language or assembly language and the like. As such optimization techniques, optimization process of reducing execution time for the control program, optimization process of reducing memory areas used to store the control program etc. have already been known.

In the above information processing apparatus, low power consumption has been requested conventionally. Particularly, in the portable information processing apparatuses, low power consumption has been required to improve consecutive running time. In addition, in the information processing apparatuses other than the portable information processing apparatuses, low power consumption has also been requested in respects of environment preservation and reduction in energy consumption.

Consumption power P in internal circuits of the information processing apparatus is expressed by the following formula.

$$P = \alpha \cdot C \cdot Vdd^2 \cdot n \cdot f + Ps$$

Where $\alpha$ is operating ratio, C is capacitance of a total circuit, $Vdd^2$ is power source voltage, n is the number of devices in the circuit, f is operating frequency, and Ps is consumption power in a standby state. In the present invention, the operating ratio $\alpha$, i.e., a switching factor or a switching probability per LSI throughout a total time required for program execution, is focused.

In the above control section, as the conventional trial to reduce the operating ratio, there have been several ways such that, either according to instructions which are being executed at that time or according to respective operating modes which are provided based on respective specifications, a clock signal is not supplied to function blocks not used, and the like. However, since the above several ways are brought about only by hardware improvements, low power consumption cannot always be attained effectively throughout execution of total program in accordance with kinds of application programs to be executed. In other words, regarding the device built-in microprocessor for use in the above application, there has been a tendency such that the same type microprocessors are built in regardless of applications to suppress cost while their peripheral circuits are built in correspondingly to the applications. On the other hand, instruction sequence patterns in the execution program and data referred to therein are significantly different depending on applications, i.e., programs to be executed. In particular, if power consumption, which is caused due to change of bit patterns on the instruction bus of the microprocessor, i.e., charge (state transition from "0" to "1")/discharge (state transition from "1" to "0") of wiring nodes for each bit on the instruction bus, is considered in respects of differences in the instruction sequence patterns, the power consumption caused by the instruction sequence patterns of the program executed repeatedly in some devices can be suppressed. But, the power consumption caused by the instruction sequence patterns of the program executed repeatedly in other devices cannot always be suppressed. In addition, there has been a way such that the main body of the processor is designed again each time according to the execution program. However, in this case, increase of cost could not be avoided. In other words, power consumption could not be sufficiently reduced by the conventional ways.

SUMMARY OF THE INVENTION

The present invention has been made in view of the above drawbacks in the prior art, and an object of the present invention is to provide an instruction sequence optimization apparatus which can executes an optimization process in the preparing stage of a control program for an information processing apparatus to reduce power consumption.

Another object of the present invention is to provide an information processing apparatus which can reduce power consumption due to change of bit patterns on the instruction bus without requiring additional cost throughout hardware/ software and modifying program optimization to increase operation speed, i.e., can achieve low power consumption according to applications.

A first feature of a first present invention is that an instruction sequence optimization apparatus which optimizes programs used in an information processing apparatus having a program memory for storing said programs, and a processing unit for fetching said programs from said program memory via an instruction bus, comprises:

an instruction sequence analyzing means for analyzing mutual dependence relations between respective instructions constituting said program, and an instruction sequence modifying means for modifying sequences of said instructions insofar as said mutual dependence relations analyzed by said instruction sequence analyzing means are not influenced to thus reduce Hamming distances between bit sequences appearing on said instruction bus when said instructions are transferred from said program memory to said processing unit.

According to the instruction sequence optimization apparatus of the first feature of the first present invention, since Hamming distances between bit sequences appearing on said instruction bus when said instructions are transferred from said program memory to said processing unit are reduced by analyzing mutual dependence relations between respective instructions constituting said program and then modifying sequences of said instructions insofar as said mutual dependence relations are not influenced, power consumption in said information processing apparatus can be reduced.

A second feature of the first present invention is that an instruction sequence optimization apparatus which optimizes programs used in an information processing apparatus having a plurality of registers for storing data temporarily, a program memory for storing said programs, and a processing unit for writing/reading data into/from said registers based on instructions fetched from said program memory via an instruction bus, comprises:

a register number recognizing means for recognizing register numbers included in respective instructions constituting said programs, a register available range recognizing means for recognizing available ranges of said register numbers recognized by said register number recognizing means, and an instruction sequence modifying means for modifying said register numbers insofar as said available ranges recognized by said register available range recognizing means are not influenced to thus reduce Hamming distances between bit sequences appearing on said instruction bus when said instructions including said register numbers are transferred from said program memory to said processing unit.

According to the instruction sequence optimization apparatus of the second feature of the first present invention, since Hamming distances between bit sequences appearing on said instruction bus when said instructions including said register numbers are transferred from said program memory to said processing unit are reduced by recognizing said register numbers of respective instructions constituting said program, then recognizing available ranges of said register numbers, and then modifying said register numbers insofar as said available ranges are not influenced, power consumption in said information processing apparatus can be reduced.

A third feature of the first present invention is that an instruction sequence optimization apparatus which optimizes programs used in an information processing apparatus having a program memory for storing said programs, and a processing unit for fetching said programs from said program memory via an instruction bus, comprises:

a storing means for storing different bit patterns indicating the same instructions which are formed of part or the whole of respective instructions constituting said programs, and an instruction sequence modifying means for replacing said instructions in said programs with bit patterns stored in said storing means to thus reduce Hamming distances between bit sequences appearing on said instruction bus when said instructions are transferred from said program memory to said processing unit.

According to the instruction sequence optimization apparatus of the third feature of the first present invention, since Hamming distances between bit sequences appearing on said instruction bus when said instructions are transferred from said program memory to said processing unit are reduced by replacing said instructions in said programs with other bit patterns indicating the same instructions, power consumption in said information processing apparatus can be reduced.

A fourth feature of the first present invention is that an instruction sequence optimization apparatus which optimizes programs used in an information processing apparatus having a program memory for storing said programs, and a processing unit for fetching said programs from said program memory via an instruction bus, comprises:

a selecting means for selecting other instruction or other instruction sequences which can result in the same processed results instead of instruction or instruction sequences included in said program, and an instruction sequence modifying means for replacing said instruction or said instruction sequences included in said program with said instruction or said instruction sequences selected by said selecting means to thus reduce Hamming distances between bit sequences appearing on said instruction bus when said instruction or said instruction sequences is or are transferred from said program memory to said processing unit.

According to the instruction sequence optimization apparatus of the fourth feature of the first present invention, since Hamming distances between bit sequences appearing on said instruction bus when said instruction or said instruction sequences are transferred from said program memory to said processing unit are reduced by replacing said instruction or said instruction sequences in said programs with other instruction or other instruction sequences which can result in the same processed results, power consumption in said information processing apparatus can be reduced.

A fifth feature of the first present invention is that an instruction sequence optimization apparatus which optimizes programs used in an information processing apparatus having a program memory for storing said programs, and a processing unit for fetching said programs from said program memory via an instruction bus, comprises:

a selecting means for selecting other instruction or other instruction sequences which can result in the same processed results instead of instruction or instruction sequences included in said program, a processing means for trially calculating power consumption on said instruction bus caused due to said instruction or said instruction sequences included in said program and caused due to said instruction or said instruction sequences selected by said selecting means with considering Hamming distances between bit sequences when said instruction or said instruction sequences is or are transferred from said program memory to said processing unit, and an instruction sequence modifying means for replacing said instruction or said instruction sequences included in said program with said instruction or said instruction sequences selected by said selecting means to thus reduce consumption power trially calculated by said processing means.

According to the instruction sequence optimization apparatus of the fifth feature of the first present invention, since power consumption caused due to said instruction or said instruction sequences included in said program and power consumption caused due to other instruction or other instruction sequences which can result in the same processed results as those of instruction or instruction sequences included in said program are trially calculated, and then said instruction or said instruction sequences included in said program are replaced with said instruction or said instruction sequences having lower power consumption, power consumption in said information processing apparatus can be reduced.

A first feature of a second present invention is that an information processing apparatus comprises a processor having an instruction decoder section for outputting control signals corresponding to input bit patterns, and a instruction executing section for executing instructions according to said control signal out from said instruction decoder section, wherein said instruction decoder section can vary corresponding relation between said bit patterns and said control signal according to frequency of combination of consecutive execution instructions to be consecutively executed by said processor.

Here said consecutive execution instructions are formed of two consecutive execution instructions.

A second feature of the second present invention is that an information processing apparatus which includes a processor having an instruction decoder section for enabling reconstruction of corresponding relations between input bit patterns and control signals corresponding to said input bit patterns, and a instruction executing section for executing instructions according to said control signal out from said instruction decoder section, comprises:

a consecutive execution instruction tracing means for receiving instruction code sequences to be executed by said processor, measuring appearing frequency of sets of consecutive execution instructions which are consisted of a plurality of instruction codes to be executed continuously among said instruction code sequences, and outputting measured results;

an instruction bit pattern redefining means for receiving said measured results output from said consecutive execution instruction tracing means, and redefining bit patterns of said instruction codes used in said instruction code sequences such that the number of changed bits in said bit patterns of said instruction codes is minimized particularly in said sets of consecutive execution instructions having higher appearing frequency;

an execution module generating means for generating execution modules executed in said processor correspondingly to outputs from said instruction bit pattern redefining means in respect of said bit patterns of respective instruction codes in said instruction code sequences; and an instruction decoder reconstructing means for reconstructing said instruction decoder section to respond to output of said instruction bit pattern redefining means.

Here said consecutive execution instructions are formed of two consecutive execution instructions.

In addition, said consecutive execution instruction tracing means receives instruction code sequences to be executed by said processor, measures respective appearing frequencies of said sets of consecutive execution instructions which are consisted of a plurality of instruction codes to be executed continuously among said instruction code sequences from heads of said instruction code sequences to ends of said instruction code sequences, and outputs measured results.

In addition, said instruction bit pattern redefining means redefines respective bit patterns of part of said instruction codes used in said instruction code sequences such that either the number of changed bits in said bit patterns between a plurality of said instruction codes constituting said sets of instructions or the number of changed bits in said bit patterns between part of a plurality of said instruction codes constituting said sets of instructions is minimized particularly in said sets of consecutive execution instructions having higher appearing frequency.

For example, said instruction decoder section is consisted of a gate array.

According to the information processing apparatus of the second present invention, bit patterns allocated to respective instruction codes or part thereof can be modified so as to reduce change of bit patterns of plural consecutive instruction codes or part thereof, without modifying instruction sequence per se of the instruction codes. As a result, consumption power due to change of the bit patterns on the instruction bus can be suppressed throughout a total program.

Therefore, since the switching factor per LSI device can be minimized by modifying the corresponding relations between said bit patterns and said control signals by means of said instruction decoder section according to combination frequency of consecutive execution instructions, low power consumption can be attained according to the applications. Further, only said instruction decoder section has to be modified in hardware since only said instruction decoder section is enabled to be modified, and thus cost thereof can also be suppressed.

Here, a processor having an instruction set architecture defined in SPARC International Inc., "The APARC Architecture Manual Version 8", Prentice Hall Inc, A Simon & Schuster Company Englewood Clifis, N.J. 07632, 1992 (referred to simply as "literature" hereinafter), and assembly instruction sequences to be executed therein are exemplified as follows. According to that the op field defined in the above literature corresponds to '10', '11', or others, schemes for dividing instruction bits are classified into three types. Fields named "Op 3" formed of 6 bits, i.e., the op field is '10' or '11', which account for most of instructions appeared in the program, are considered particularly hereinafter. Where the op 3 fields is defined as a field used for distinguishing suitable controls in the processor IU (Integer Unit) against respective instructions such as add instruction, load instruction, shift instruction, for example (This field is referred to simply as "op 3 fields" hereinafter).

In the present invention, either assembler instruction sequences to be executed are converted into execution object files by existing compiler, in which bit patterns of the op 3 fields in respective instructions are defined as shown in the above literature, or assembler instruction sequences are input into the consecutive execution instruction tracing means as they are. Here the execution object files or the assembler instruction sequences are traced, and respective appearing frequencies of sets of two consecutive instructions, for example, are measured in the op 3 fields to be focused. In this case, regarding respective branch instructions on the instruction sequences, appearing frequency of respective instruction sets may be measured dynamically, i.e., by tracing respective branches according to actual executions of applications, or may be measured statically, i.e., by estimating rate of respective branch methods in respective branch points before execution of applications. Advantages corresponding to each way can be attained by either way.

Next, the bit patterns of the op 3 fields in respective instructions are determined by the instruction bit pattern redefining means so as to reduce change of the bit patterns of the op 3 fields between two instructions, each having high appearing frequency.

In particular, this means that bit patterns to minimize the evaluation function, i.e.,

| Σ instruction used | (appearing frequency of sets of two instructions) * (changed bit number of op 3 fields between two instructions) |
|---|---| must be allocated to respective instructions. As a result, if the bit patterns can be determined between instructions having the highest appearing frequency such that only one bit is changed in the op 3 fields, such bit patterns may be selected.

By referring to the result of the instruction bit pattern redefining means, the execution module generating means generates newly execution object files, which are modified so as to coincide the op 3 fields in respective instructions in the assembler instruction sequences to be executed with the above results.

On the contrary, by referring to the instruction bit pattern allocation table, the instruction decoder reconstructing means reconstructs the instruction decoder section, which is originally constructed by reconstructible devices, so as to interpret the op 3 fields as shown in the table and then execute the corresponding instructions. In other words, only said instruction decoder section has to be modified in hardware since only said instruction decoder section is enabled to be modified, and thus cost thereof can also be suppressed.

In addition, according to the second feature of the second present invention, original assembler instruction sequences can be executed by execution object files generated as above and the reconstructed instruction decoder so as to reduce change of bit patterns on the instruction bus throughout the program. As a result, consumption power caused on the instruction bus can be suppressed according to applications to be executed.

BRIEF DESCRIPTION OF THE DRAWINGS

FIG. 5 is a view illustrating an example of a program which is optimized by an instruction sequence optimization apparatus according to the first embodiment shown in FIG. 2;

FIG. 6 is a view illustrating an assembly source program list wherein the program shown in FIG. 5 is compiled;

FIG. 7 is a view illustrating an assembly source program list wherein the program shown in FIG. 5 is compiled;

FIG. 8 is a view illustrating an assembly source program list wherein the program shown in FIG. 5 is compiled;

FIG. 9 is a view illustrating an assembly source program list wherein the program shown in FIG. 5 is compiled;

FIG. 12 is a view showing bit patterns of the basic blocks in FIG. 5;

FIG. 13 is a view showing bit patterns after optimization process by the first embodiment shown in FIG. 2 is effected;

FIG. 14 is a reference view showing bit patterns explaining an effect obtained by optimization process by the first embodiment shown in FIG. 2;

FIG. 16a and 16b are a view showing bit patterns of a program used in the apparatus shown in FIG. 4;

FIG. 20A is a view showing an example of a program of intermediate codes used in the optimization process effected by the instruction sequence optimization apparatus according to the second embodiment shown in FIG. 19;

FIG. 20B is a view showing an optimized result of the program shown in FIG. 20A;

FIG. 21 is a view showing a table of available range of the program shown in FIG. 20A;

FIG. 23 is a view showing a program wherein the optimization process as to an "add" instruction of the third embodiment is effected;

FIG. 25A is a view showing an example of a program before optimization process according to the fourth embodiment is effected;

FIG. 25B is a view showing an example of a program after optimization process according to the fourth embodiment is effected;

FIG. 28A is a view showing an example of an assembly source program;

FIG. 28B is a table showing respective instruction fields of bit sequences obtained by assembling the example shown in FIG. 28A;

FIG. 30 is a table showing respective appearing frequencies of respective instruction combinations in the assembly source program shown in FIG. 28A;

DETAILED DESCRIPTION OF THE PREFERRED EMBODIMENTS

An instruction sequence optimization method and an apparatus for embodying the same in an information processing apparatus according to a first embodiment of a first present invention will be explained hereinafter.

Figure 1:
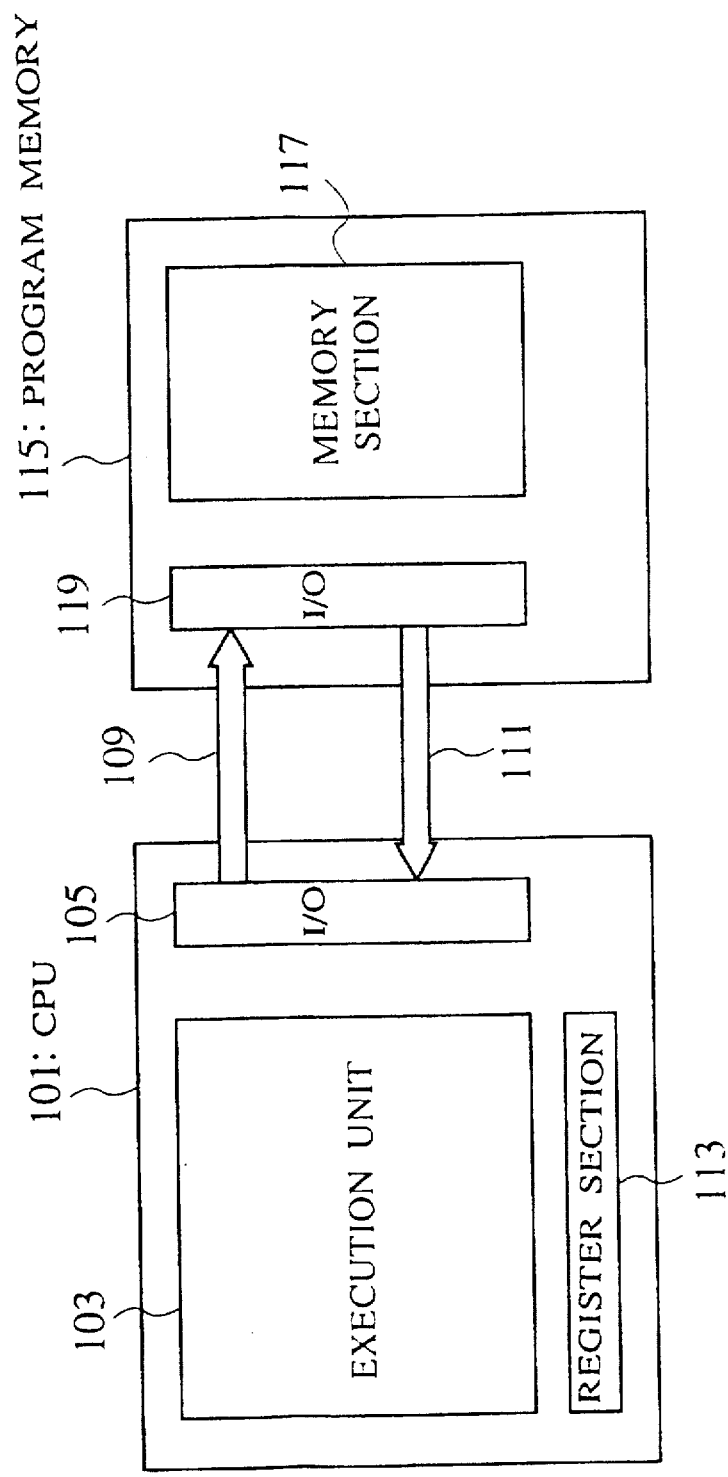
FIG. 1 is a schematic block diagram showing a configuration of a control section of a portable information processing apparatus.
Figure 2:
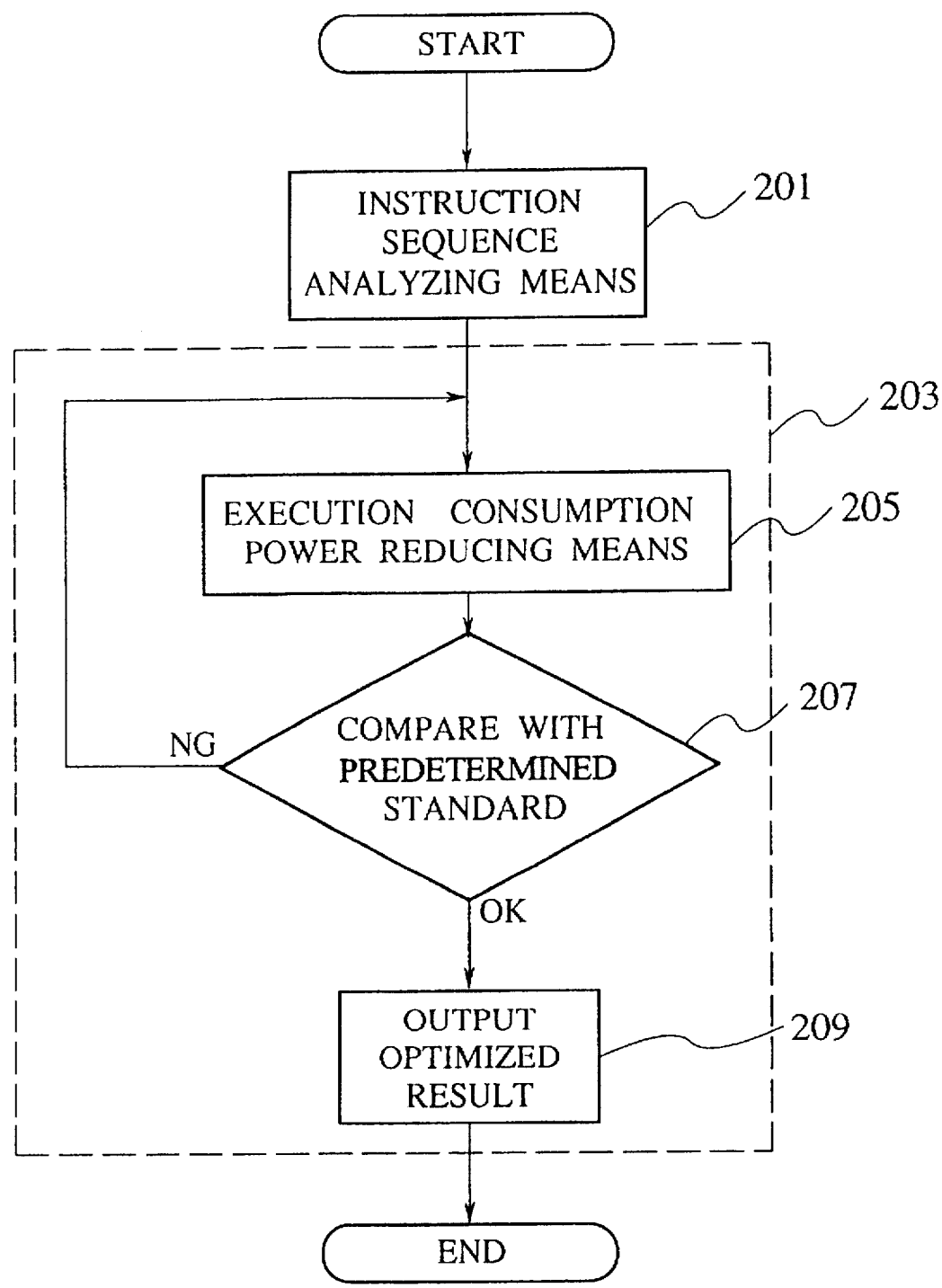
FIG. 2 is a flowchart illustrating schematically a concept of an instruction sequence optimization method according to a first embodiment of a first present invention.

FIG. 2 is a flowchart showing schematically a concept of an instruction sequence optimization method according to a first embodiment of the invention. As shown in FIG. 2, in the instruction sequence optimization method, first mutual dependence relations of respective instructions constituting a program are analyzed by an instruction sequence analyzing means (step 201). And, sequences of the instructions are modified so as to reduce Hamming distances between bit sequences appearing on the instruction bus without influence to the dependence relation (step 203). Thus, low power consumption caused on the instruction bus can be achieved by the modification of the instruction sequences. In the step 203, first the instruction sequences are modified and the Hamming distances at that time are determined by a power consumption reducing means (which corresponds to a instruction sequence modifying means) (step 205). Then, the Hamming distances thus determined are compared with standard values (step 207). Here, either predetermined values or the smallest values of the Hamming distances determined by the power consumption reducing means may be used as the above standard values. In case the Hamming distances determined by the power consumption reducing means is shorter than the standard values, these sequences of the instructions are output as the optimization results, thus completing this optimization process (step 209). On the contrary, in case the Hamming distances determined by the power consumption reducing means is longer than the standard values, the same processes are executed repeatedly for other instruction sequences (steps 205, 207).

Sequentially, concrete examples embodying the concept shown in FIG. 2 will be explained with reference to a flowchart shown in FIG. 3.

Now a case wherein the instruction sequence optimization method of the present invention is applied to optimize the control program in which both the execution unit and the instruction bus are used in 32 bit information processing apparatus (refer to FIG. 4A) will be explained by way of example.

Figure 3:
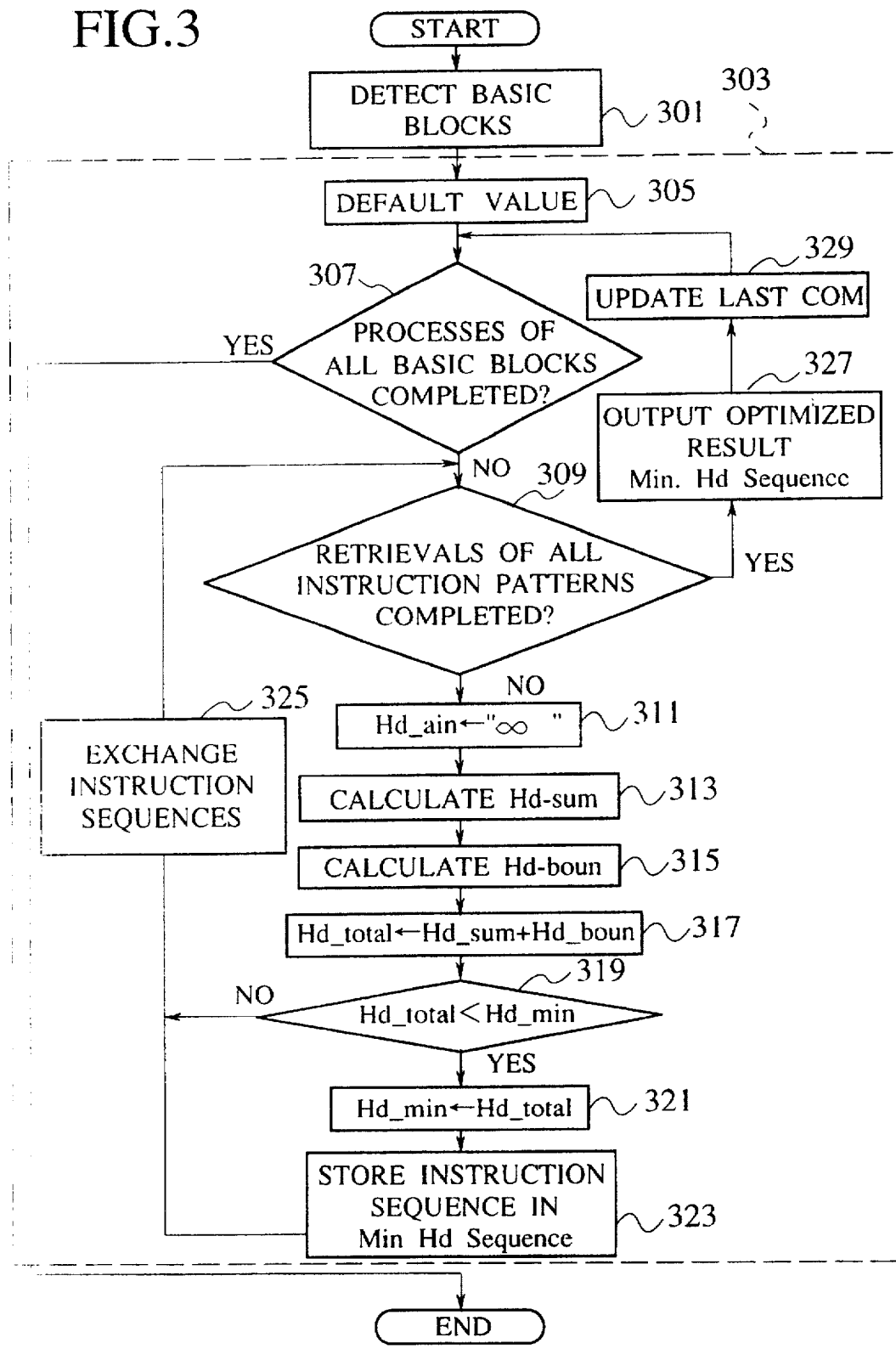
FIG. 3 is a flowchart illustrating an embodiment of the concept shown in FIG. 2.

In FIG. 3, the control program is divided into basic blocks in step 301. Here the basic block is defined as a program block like arrangements of formulae and substitution sentences, for example, wherein neither branch to the exterior in the middle of the block nor branch from the exterior in the middle of the block is occurred. If the division into the basic blocks is finished, then dependence relations between respective instruction sequences in the basic blocks and dependence relations between registers are analyzed. Thus, a range not to infringe the rule of causality of process can be specified even if the instructions are exchanged. And, an identifier for identifying respective ranges identified as above is added to the program.

Since the processes in step 301 are the processes utilized in other optimization processes which are well known conventionally, detailed explanations thereof are omitted here. As the literature disclosing such processes, the followings are listed by way of example.

Z. Li and P-C. Yew, "Efficient Interprocedual Analysis fir Program Parallelization and Restructuring", Proc. ACM SIGPLAN PPEALS, pp.85-97, 1988.

S. Jain and C. Thompson, "An Efficient Approach to Dataflow Analysis in a Multiple Pass Global Optimizer", Proc. SIGPLAN' 88 Cof. on Prog. Lang. Design and Implementation (PLDI' 88), pp.154-163, 1988.

Next, optimization process is effected every basic block in step 303. Process procedures in this step 303 will be explained hereinbelow.

First, initialization is effected in step 305. In step 305 in FIG.3, the last instruction of the basic blocks in which the optimization process has been performed precedingly is substituted into a variable LastCom. In the initialization, a default value (one of instruction bit sequences) is substituted into the variable LastCom. Any value may be used as the default value. For instance, all bits may be set to "1", or all bits may be set to "0". However, it is preferable actually that instructions which appear most frequently in the statistics, header program linked finally (prologue program, i.e., program for starting the program prepared by the target user from OS and then returning to OS after completing the execution), final instructions such as run time routine, or the like is used as the default value.

In the following steps 307 to 325, process to minimize Hamming distances is effected. In procedures explained here, a simple and firm "one by one method" which optimizes bit patterns by modifying instruction sequences sequentially to check entire available patterns is adopted. In the case of the basic blocks having complicated data structure, it is effective to execute high speed process by using customized processes, but the present invention is not limited to this.

In step 307, it is decided whether entire processes are completed or not. Since optimization process in the first embodiment is executed every basic block, optimization process is terminated at the time when processes of all basic blocks are completed. As the result of this decision, in case the basic blocks not processed remain, processes in step 309 and thereafter are executed. In step 309, it is determined whether optimization processes in the basic blocks are completed or not. Such optimization processes are executed by replacing execution sequences of respective instructions in the basic blocks. If checks on all available replacements (sequences) are completed without contradiction in sequence dependence of instructions, register dependence etc., processes of the target basic blocks are completed. Then process proceeds to step 327. On the other hand, unless checks on all available replacements are completed, optimization processes in step 311 and thereafter are still continued.

In step 311, initialization is effected in advance of optimization in the basic blocks. In step 311 in FIG. 3, a variable Hd_sum denotes sum total of Hamming distances between instructions in the target basic blocks, and a variable Hd_boun denotes Hamming distance between a variable LastCom and a leading instruction of target basic block. A variable Hd_total denotes sum of the variable Hd_sum and the variable Hd_boun. A variable Hd_min denotes the minimum value of the variable Hd_total. "∞" is substituted for the variable Hd_min as an initial value. Here "∞" is regarded as the largest value of all the numerals.

In step 313, sum total of Hamming distances in the target basic blocks is calculated and then substituted for the variable Hd_sum. The sum total can be simply calculated such that bit patterns of adjacent instructions are compared with each other, and "1" is set in respective digits if bit values of corresponding digits in both bit patterns are different from each other, and then the "1" s are accumulated.

In step 315, Hamming distance between the last instruction (variable LastCom) in the previously processed basic block and leading instruction in the succeedingly processed basic block is calculated like step 313, and the result is substituted for the variable Hd_boun. By executing this process, optimization processes extending over plural basic blocks can be executed.

In step 317, sum total of Hamming distances between instructions in current instruction sequence patterns, i.e., sum of the variable Hd_sum and the variable Hd_boun, is calculated, and then the result is substituted for the variable Hd_total.

In step 319, the value of the variable Hd_total obtained in step 317 and the minimum value Hd_min among the variables Hd_total obtained by subsequent checks are compared. If Hd_total≧Hd_min, step 325 and following steps are executed to check different instruction sequences patterns further. On the contrary, if Hd_total<Hd_min, step 325 and following steps are executed after steps 321 and 323 are executed.

In steps 321 and 323, variables are updated. First, in step 321, the value of the variable Hd_total is substituted for the Hd_min. Then, in step 323, the instruction sequence pattern corresponding to the Hd_min is stored in the variable MinHdSequence.

In step 325, exchange of the instruction sequences are performed. Here, instruction sequences which are not checked yet are generated by exchanging instruction sequences in the basic blocks, and then the process returns to step 309. In this exchange of instructions, it should be careful that contradiction is not caused in the rule of causality based on the result of analyzation executed in step 301.

Optimization can be achieved by executing repeatedly processes explained above in step 307 to step 325. If checks of all instruction sequence patterns are completed (step 309), step 327 is executed subsequently. In step 327, optimized instruction sequences (stored in the variable MinHdSequence) are output as the result of optimization.

In step 321, the variable LastCom is updated. In other words, the last instruction stored in the variable MinHdSequence is substituted for the variable LastCom.

Similarly to the above explanations, processes in step 307 and thereafter are executed in the following basic blocks.

Subsequently, taking a case wherein the program shown in FIG. 5 is used as an example, a case wherein optimization processes in the first embodiment are actually executed will be explained.

The program in FIG. 5 is a program used for calculating the inner product of integers and is described by the C language.

FIGS. 6 to 9 show an assembly source program list when the program shown in FIG. 5 is compiled by the "Sun SPARC C compiler". In FIGS. 6 to 9, the first column denotes line numbers, the second column denotes addresses, the third column denotes object codes, and the fourth column denotes assembly sources. C101 to C313 and B1 to B6 are symbols used for explanation. Here, explanations as to assembly grammar, mnemonic, etc. are omitted since they are well known technology. But, as literatures disclosing such well known technology, the followings are listed by way of example.

SPARC International Inc., The SPARC Architecture Manual Version 8, Prentice-Hall Inc., A Simon and Schuster Company Englewood Cliffs, N.J. 07632.

The assembly source program shown in FIGS. 6 to 9 are input into the optimization processing apparatus of the first embodiment. In this assembly source program, the basic blocks are retrieved in step 301 in FIG. 3. Thereby, this program is divided into six basic blocks as shown by B1 to B6 in FIGS. 6 to 9.

Figure 10:
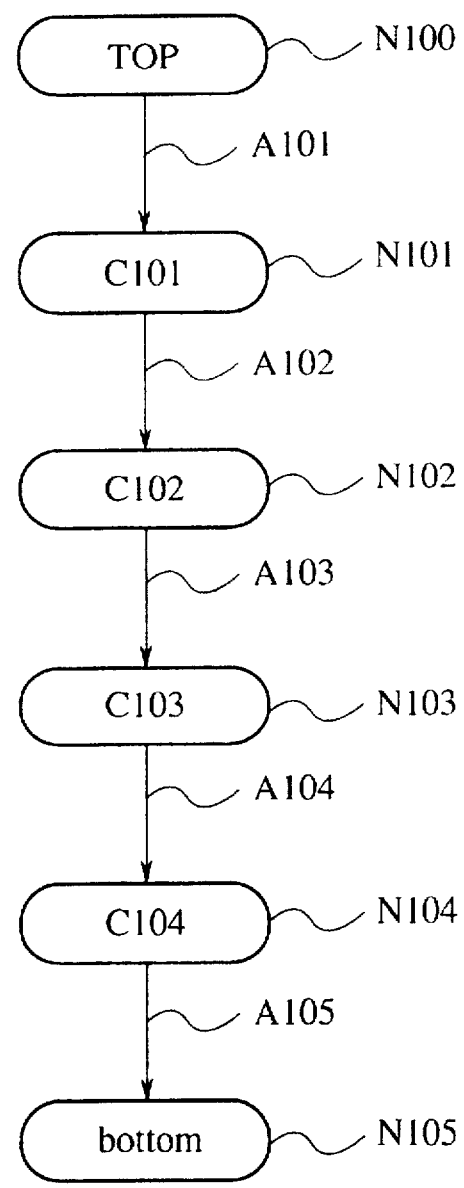
FIG. 10 is a directed graph showing an analyzation result of dependence relations between the basic blocks in FIG. 5.
Figure 11:
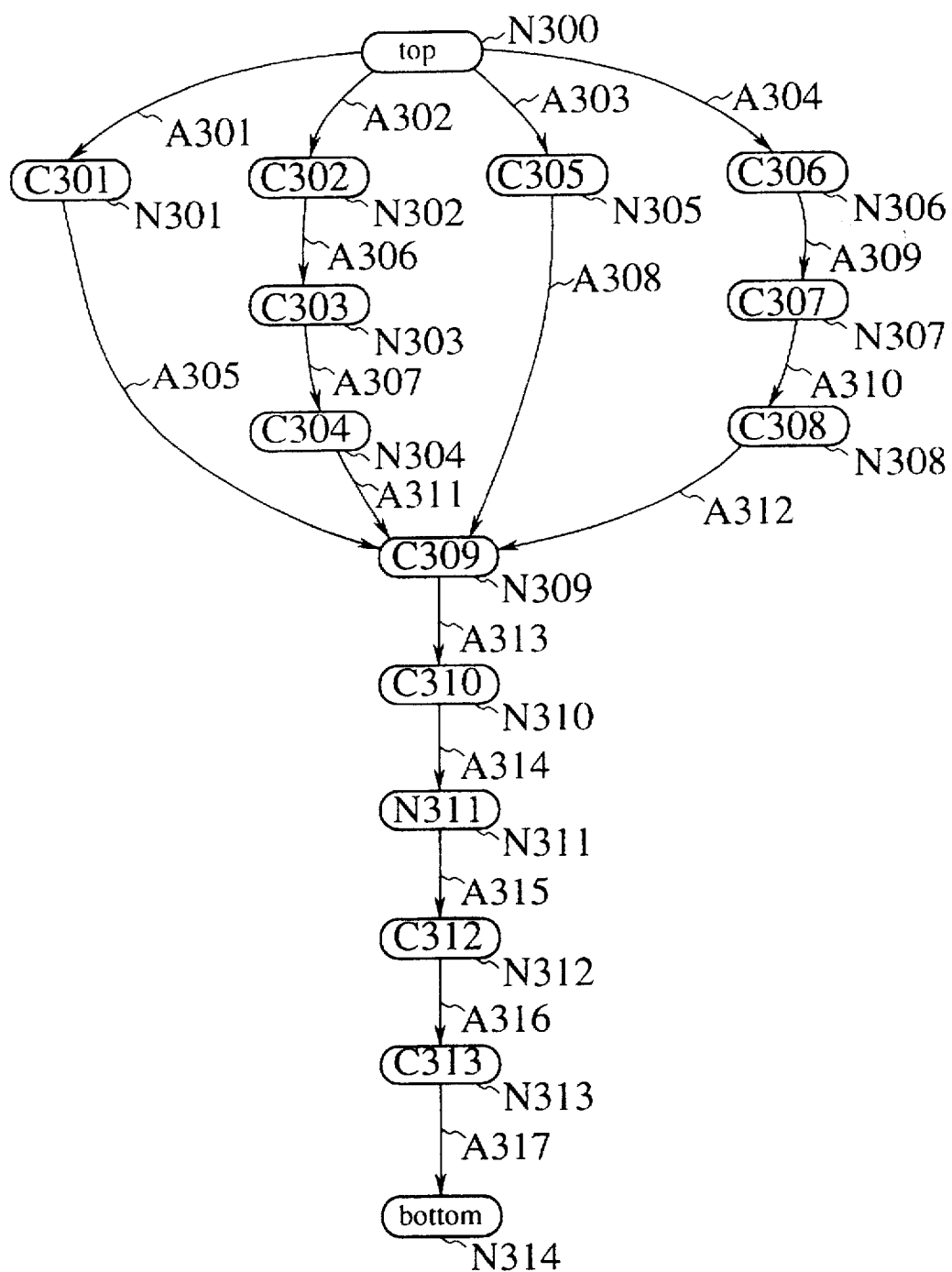
FIG. 11 is a directed graph showing an analyzation result of dependence relations between the basic blocks in FIG. 5.

In addition, dependence relations between instructions in respective basic blocks are analyzed. FIGS. 10 and 11 are directed graphs showing analyzed results of the dependence relations. In particular, FIG. 10 is a directed graph of the basic block B1 (refer to FIG. 6), and C101 to C104 in FIG. 6 correspond respectively to nodes N101 to N104 in FIG. 10. Similarly, FIG. 11 is a directed graph of the basic block B3 (refer to FIG. 7), and C301 to C313 in FIG. 7 correspond respectively to nodes N301 to N313 in FIG. 11. Further, nodes N100 and N300 are dummy nodes representing tops of the directed graph, and nodes N105 and N314 are dummy nodes representing bottoms of the directed graph. Furthermore, arcs A101 to A105, A301 to A314 shows dependence relations between instructions, and indicates that instruction must not be executed in the reverse direction of the arrow. Sequences of instructions in the basic blocks are managed by preparing these directed graphs.

First, optimization process of the first basic block B1 will be explained. The basic block B1 shows prologue process for preserving inner states to execute main program. As shown in the directed graph in FIG. 10, since four instructions C101 to C104 can be executed only in this order, they are output as they are.

Although explanations of optimization process in the second basic block B2 are omitted, "nop" as the last instruction C204 is stored in the variable LastCom at the time of completing the process in the basic block B2.

Next, optimization process in the third basic block B3 is executed. As shown in the directed graph in FIG. 11, the order of the instruction sequences can be exchanged mutually between "C301", "C302 to C304", "C305" and "C306 to C308" in the basic block B3. However, the order of the instruction sequences cannot be exchanged in "C302 to C304" and "C306 to C308". And, C309 to C313 can be executed only in this order, but cannot be executed before C301 to C308.

First, if the instruction sequence patterns are set as shown in FIG. 7, i.e., are set to the order of C301, C302 . . . C313, steps 311 to 323 for optimization processes shown in FIG. 3 are executed. At this time, as described above, "nop" is stored in the variable LastCom as the last instruction C204 in the basic block B2. In addition, "∞" is substituted for the minimum Hamming distance Hd__min as the initial value.

FIG. 12 shows bit patterns of the last instruction C204 in the basic block B2 and respective instructions C301 to C313 in the basic block B3. If the Hd__sum, the Hd__boun, and the Hd__total of these bit patterns are calculated (refer to steps 313 to 317 in FIG. 3)., the Hd__sum=161, the Hd__boun=13 and thus the Hd__total=174 are obtained.

Here, since the minimum Hamming distance Hd__min=∞, the Hd__total=174 is substituted for the Hd__min as the comparison result in step 319 (refer to FIG. 3),(step 312). In addition, the instruction sequence shown in FIG. 7 is stored in the variable MinHdSequence (step 323).

Next, in case the instruction sequences are exchanged, the same process is executed (step 311).

Then, if checks of all exchangeable instruction sequences are terminated, instruction sequences stored in the variable MinHdSequence are output as the optimized result of the instruction sequences (step 327).

The bit patterns of the instruction sequences output in step 327 are shown in FIG. 13. As a reference example, the worst bit pattern (that is, bit pattern having the largest sum total of Hamming distances) is shown in FIG. 14. Sum total of Hamming distances Hd__total in FIG. 13 becomes 130. Sum total of Hamming distances Hd__total in FIG. 14 becomes 196. In other words, according to the first embodiment, the number of switching times on the instruction bus can be reduced to 74.7% by the optimization process in comparison with that obtained before optimization when the basic block B3 is executed. Also, it can be reduced to 66.3% in the worst case.

Subsequently, optimization processes in the fourth to sixth basic blocks B4 to B6 are executed in the same manner. However, since the order of the instruction sequences cannot be exchanged in respective basic blocks B4 to B6, they are output as they are. Then the process is terminated.

Next, a modification of the instruction sequence optimization apparatus according to the first embodiment will be explained with reference to FIG. 15.

There are some cases where a "do not care" bit (bits), i.e., a bit which does not affect the operation of the instruction if the value of the bit is either "1" or "0", is included in the instruction format. For instance, in the above basic block B3, the twelfth bit to the sixth bit of respective instructions C303, C304, C307, C308 (bits <11:5>) are "do not care" bits (refer to FIG. 12). There are some cases wherein Hamming distances between adjacent instructions can be reduced by modifying such bit values suitably.

Figure 15:
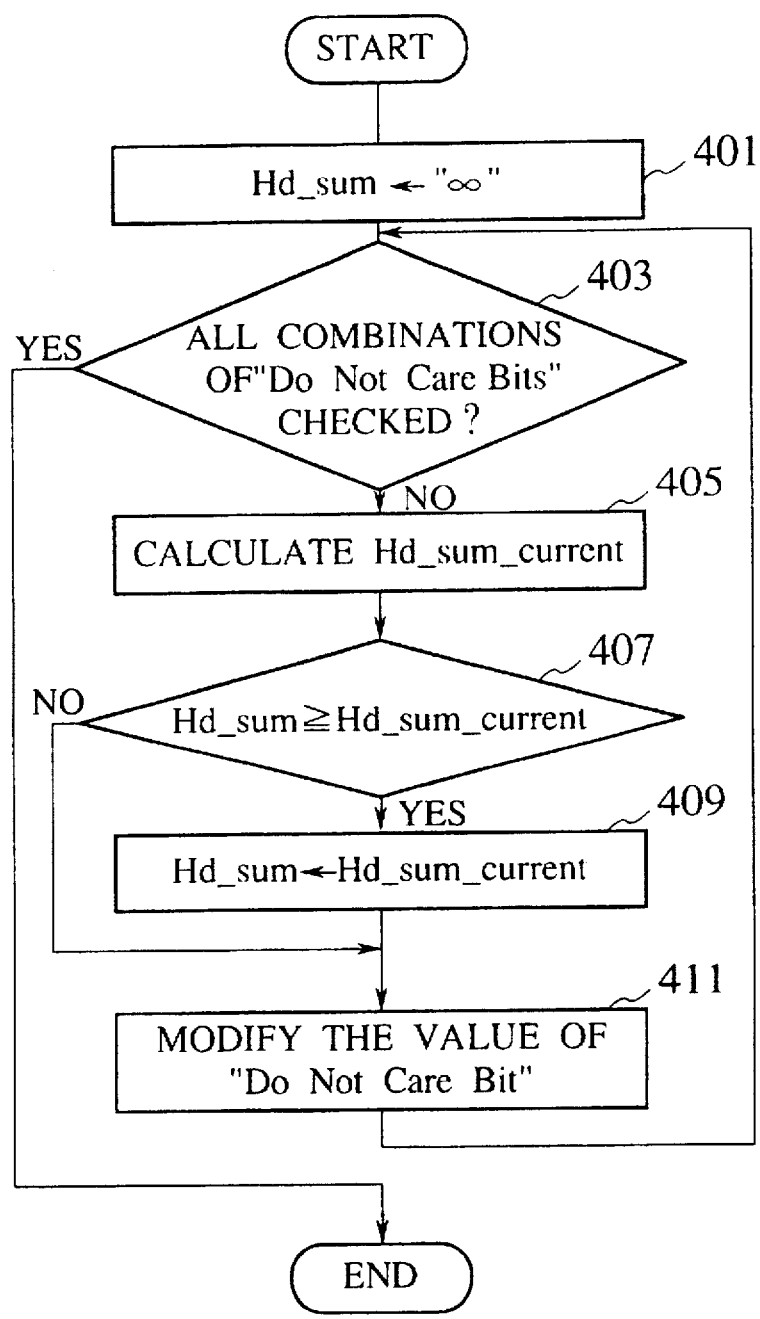
FIG. 15 is a flowchart illustrating a modification of the first embodiment shown in FIG. 2.

FIG. 15 is a flowchart showing an example of a process to reduce Hamming distances by modifying the bit value of "do not care".

If processes shown in FIG. 15 are executed in place of step 313 in FIG. 3, Hamming distances can be reduced further while taking "do not care" bits into consideration.

In FIG. 15, in step 401, the initial value "∞" is substituted for the variable Hd__sum upon initialization.

Next, in step 403, it is determined whether a main process is terminated or not. In the main process, the following checks are executed while modifying all bit values of "do not care". When the whole checks regarding "1" and "0" combination of "do not care" bits are completed, the main process is ended.

In step 405, regarding bit patterns of "do not care" at current time, sum total of Hamming distances between adjacent instructions are calculated, and then the result is substituted for the variable Hd__sum__current.

In step 407, the Hd__sum and the Hd__sum__current are compared. If the Hd__sum≧the Hd__sum__current, the value of the Hd__sum__current is substituted for the Hd__sum in step 409. Then the process advances to step 411. On the contrary, if the Hd__sum <the Hd__sum__current, the process advances to step 411 as it is without executing step 409.

In step 411, bit patterns of "do not care" are modified into bit patterns which are not checked yet.

In the program before optimization of the basic block B3, for example (refer to FIG. 12), sum total of Hamming distances Hd__sum, Hd__total can be reduced by 10 by such process.

The control program which is optimized as explained above is stored in the program memory of the information processing apparatus. Power consumption on the instruction bus can be reduced by effecting control of CPU etc. by virtue of the control program.

In the first embodiment, procedures in one path scheme wherein optimization of input data is sequentially executed are shown. Therefore, there can be some cases wherein the instruction sequences derived finally do not always have the minimum Hamming distance. This is because, in optimization process at the boundary between the basic blocks, only the last instruction of the basic block immediately before the Thus,t basic block is considered. Thus, in order to reduce Hamming distances further more, there is a method wherein, for example, the next basic block subsequent to the target basic block and the basic block subsequent to the next basic block etc. are also considered. However, it is desired that, in order to achieve optimization by simple process quickly, processes are divided into basic blocks.

In addition, in case both optimization process according to the present embodiment and other optimization process (for example, optimization process for shortening execution time of the control program, optimization process for reducing memory areas used for storing the control program, etc.) are executed in the assembly source program, advantages of the present embodiment can be attained regardless of the order of respective optimization processes. However, in order to obtain advantages of the present embodiment the most effectively, it is preferable to execute the optimization according to the present embodiment finally. Now, in case the optimization according to the present embodiment is executed finally, there is a disadvantage such that the results of other optimization processes have been modified. But, preventions of such disadvantage may be treated in a dependence analyzation phase in step 201 (refer to FIG. 2). In other words, in the directed graphs shown in FIGS. 10 and 11, limitations may be set so as not to modify the results of other optimization processes.

Figure 4A:
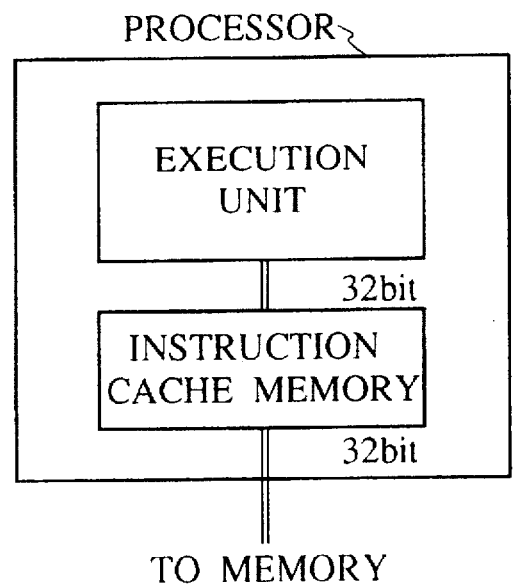
FIGS. 4A and 4B are schematic block diagrams showing a configuration of an apparatus in which a program optimized by the first embodiment shown in FIG. 2 is used.
Figure 16:
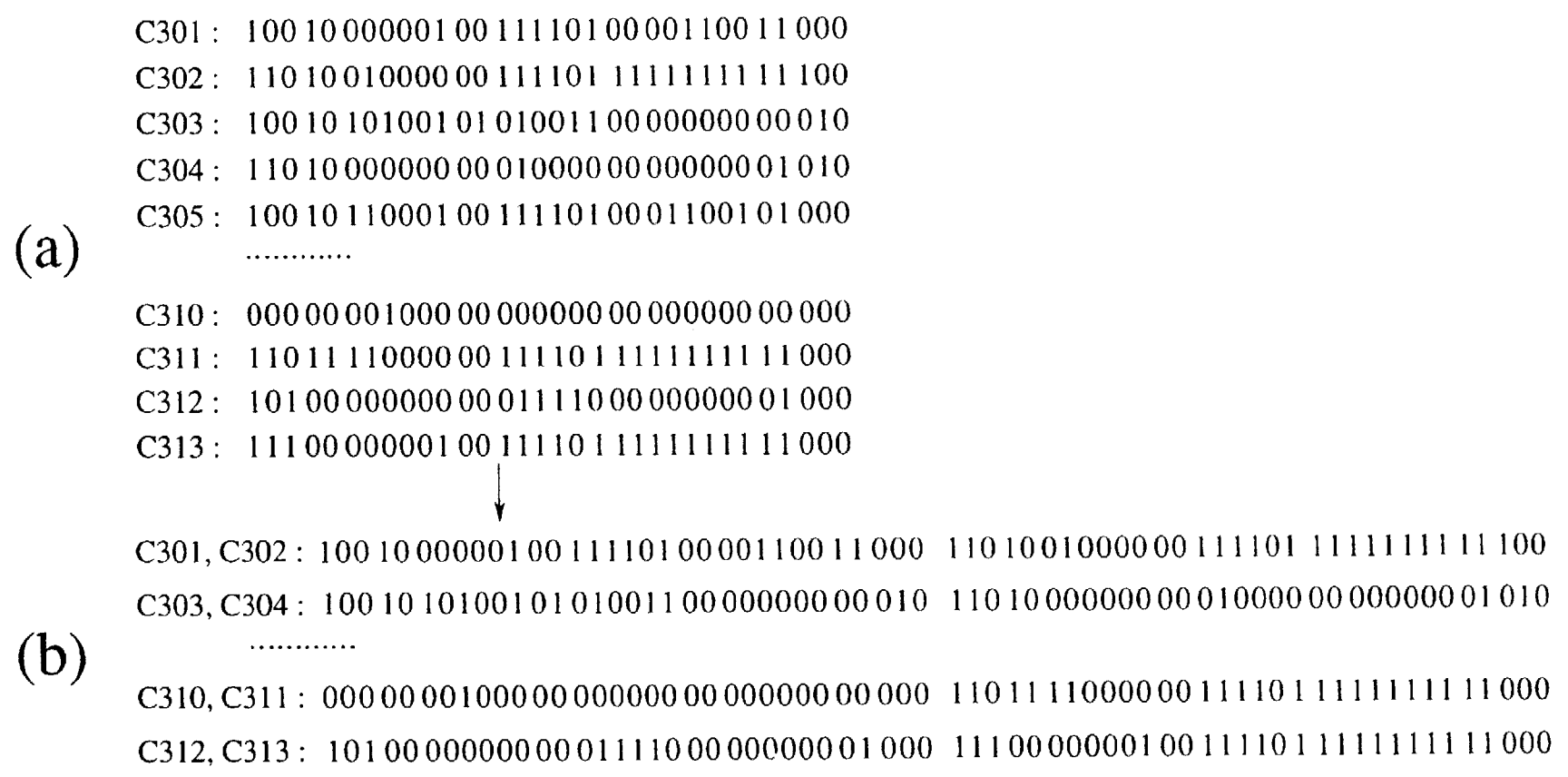

In the present embodiment described advance, optimization of the control program used in the information processing apparatus in which both the execution unit and the instruction bus are formed as 32 bit system is exemplified. More particularly, the control program optimized in the present embodiment is prepared based on the assumption that it is used for the control of the information processing apparatus which reads, fetches, issues, decodes and executes the instruction one by one, as shown in FIG. 4A. Therefore, as shown in FIG. 16A, Hamming distances to be considered in optimization process are Hamming distances between adjacent instructions.

Figure 4B:
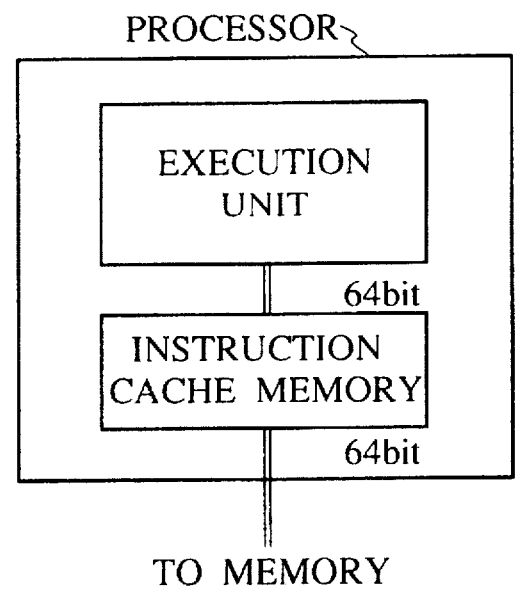

However, as shown in FIG. 4B, most of CPUs are so constructed today that it can read, fetch and issue a plurality of instructions at a time. When using such CPU, Hamming distances to be considered upon optimization are not those between adjacent instructions, but those between instructions allocated on the same bit positions in the same fields of the instruction bus. More particularly, in case the control program used for the CPU having the structure such that instructions are read every two instructions at a time, as shown in FIG. 4B, optimization process may be executed so as to reduce Hamming distances between every other instructions (for example, between C301 and C303, C302 and C304, etc.), as shown in FIG. 16B. In this case, if bit sequences are formed by means of bit connecting (concatenation) of every two instructions, the optimization apparatus of the present embodiment may be used as it is to execute optimization process.

Figure 17:
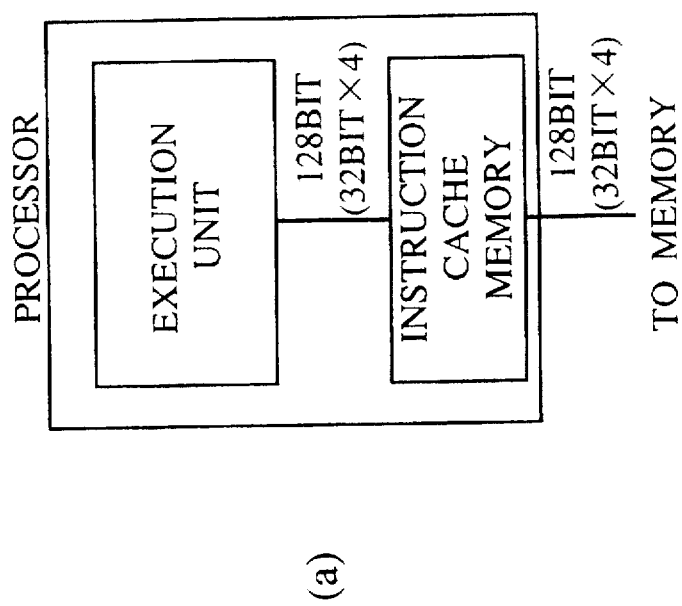
FIG. 17A is a schematic block diagram showing a configuration of an apparatus in which a program optimized by the first embodiment shown in FIG. 2 is used.
FIG. 17B is a view showing bit patterns of a program used in the apparatus shown in FIG. 17A.

FIG. 17A shows an apparatus which is constructed to read every four instructions at a time. In this case, as shown in FIG. 17B, optimization may be executed such that Hamming distances between every three instructions (for example, between C301 and C305, C302 and C306, etc.) are reduced. Further, if bit sequences are formed by means of bit connecting of every four instructions, the optimization apparatus of the present embodiment may be used as it is to execute optimization process.

Figure 18:
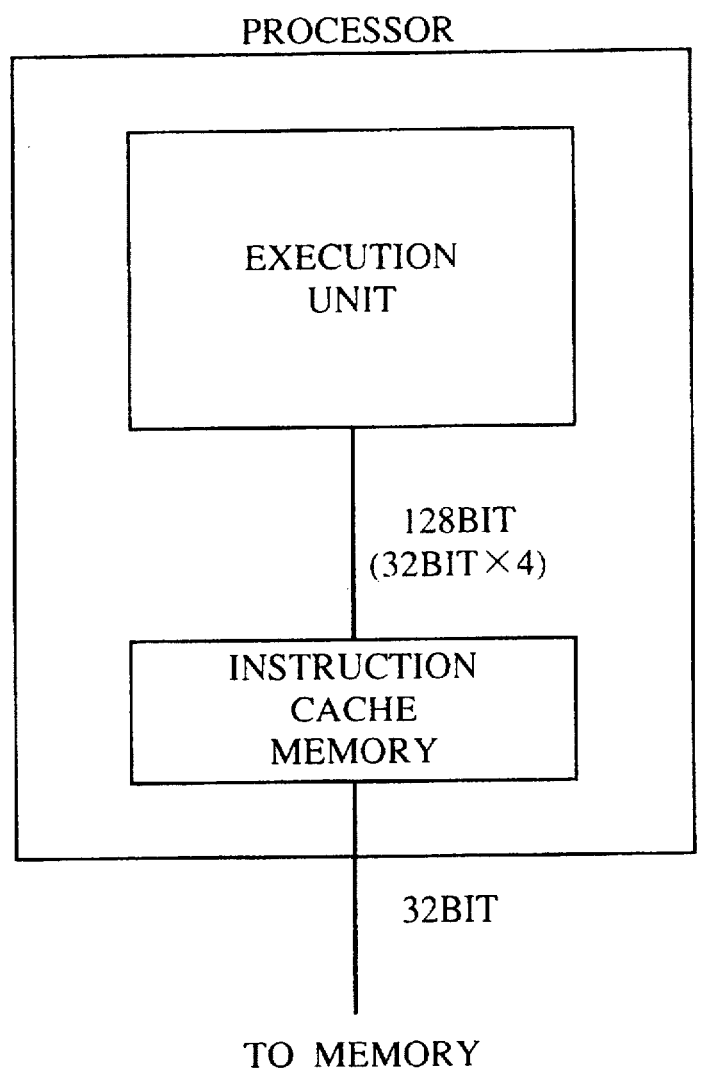
FIG. 18 is a schematic block diagram showing a configuration of an apparatus in which a program optimized by the first embodiment shown in FIG. 2 is used.

In some information processing apparatuses, a bandwidth of an inner instruction bus is different from that of an external instruction bus. FIG. 18 shows a configuration of an apparatus in which a bandwidth of an inner instruction bus is formed as 128 bits while a bandwidth of an external instruction bus is formed as 32 bits. In this case, Hamming distances may be reduced between every three instructions on the inner bus whereas Hamming distances may be reduced between adjacent instructions on the external bus. It can be determined suitably according to a degree of contribution to reduction of power consumption, etc. that which reduction must be executed preferentially or both reductions must be compromised mutually.

Next, a second embodiment of the first present invention will be explained.

Now, the execution unit and the instruction bus both being formed as 32 bits will be explained by way of example here.

In an instruction sequence optimization apparatus of the second embodiment, the control program is optimized while focusing an attention on variables to be allocated to registers. In other words, with watching an amount of bit changes in a certain interval of instruction sequences on which the variables appear, the number of registers are allocated to respective variables so as to minimize the amount of bit changes.

In the second embodiment, it is assumed that, in c=a−b, c=a/b, etc., a denotes source, b denotes target, and c denotes destination, and that a register for holding the value a is called a source register, a register for holding the value b is called a target register, and a register for holding the value c is called a destination register. In the instruction of 32 bits, the first to the tenth bits and the twenty-first to twenty-seventh bits counted from MSB on the left side are set as instruction code fields, the eleventh to the fifteenth bits are set as a destination register field, the sixteenth to the twentieth bits are set as a source register field, and the twenty-seventh to the thirty-second bits are set as a target register field.

Data available range stored in a certain register number is defined as a range spanning from that data is stored in the register by the instruction in which the register number appears as the register number of the destination, to the instruction required for the stored data, i.e., the instruction wherein the register number appears as the source register or the target register. It is of course that one register number is used effectively as a temporary storage location for a plurality of variables or data. Thus, in order to know a range that one register number can store a certain register data in the program, it is needed that an available range table must be prepared by analyzing the register allocation table which is formed when register numbers are allocated by the optimization section of the compiler.

The available range table can be prepared readily from the register allocation table. Usually, the compiler generates a data flow graph or a dependence graph from the source program. By use of the graph, registers are allocated sequentially to store either data of a certain variable or data indicating intermediate results of temporary operations. Now, in the prior art, registers have been registered into the allocation table when the variables appear, and entries of the variables which are considered as unnecessary ones by the data flow graph or the dependence graph have been deleted from the allocation table of the registers. Thereby, an address range wherein data stored in the register of a certain register number are effective has been determined. In other words, an effective period spanning from that effective data are written by load instruction or based on operation results to that the last operation instruction or the last store instruction requiring the data appears has been determined.

When allocating register numbers, if the following source programs, for example, are used, c=a+b c=c*d it may be assumed that a: register 0 b: register 1 c: register 2 d: register 3, and also programs after being compiled may be assumed as the program (1), add r0, r1, r2 mul r2, r3, r2.

Otherwise, the programs may be assumed as that only c is stored as the multiplication result in the register 5, i.e., the program (2)

add r0, r1, r2 mul r2, r3, r5.

In this case, plural register numbers are allocated to the variable c of the source program. In the prior art, like the above program (1), unless data removal from the register is required, allocation to plural register numbers has been avoided as much as possible from a view point of the register resource, excluding the case wherein a certain register has its special meaning or its special function like the global register in the register window of SPARC, for example. On the contrary, in the second embodiment, like the program (2), allocation to plural registers are performed. Thus, since the evaluation range of the evaluation object can be divided, the evaluation range can be narrowed to thus increase the evaluation objects. While, if the certain register has its special meaning or its special function as stated above, register numbers cannot be allocated to registers except for the register having the same function as that of the originally allocated register. Therefore, it should be careful since the selection range is restricted.

After the available range table is prepared, Hamming distance of the target register number is calculated, and other allocatable register number is reallocated. When other register numbers are reallocated, an evaluation range can be divided into a plurality of ranges by trying to allocate other register number to a plurality of registers further.

In the second embodiment, plural register numbers can be evaluated simultaneously. If the register number to be evaluated at the same time is restricted to a single register number, the number of replaceable register numbers are limited inevitably. But, if a plurality of register numbers are evaluated simultaneously, optimization of replacement can be effected by using these plurality of register numbers as mutually replaceable register numbers.

In addition, a procedure of reallocating register files may be effected when registers are allocated by the compiler or may be effected after the allocation is done once.

Next, a concrete example of the instruction sequence optimization apparatus of the second embodiment will be explained with reference to FIGS. 19 to 21.

Figure 19:
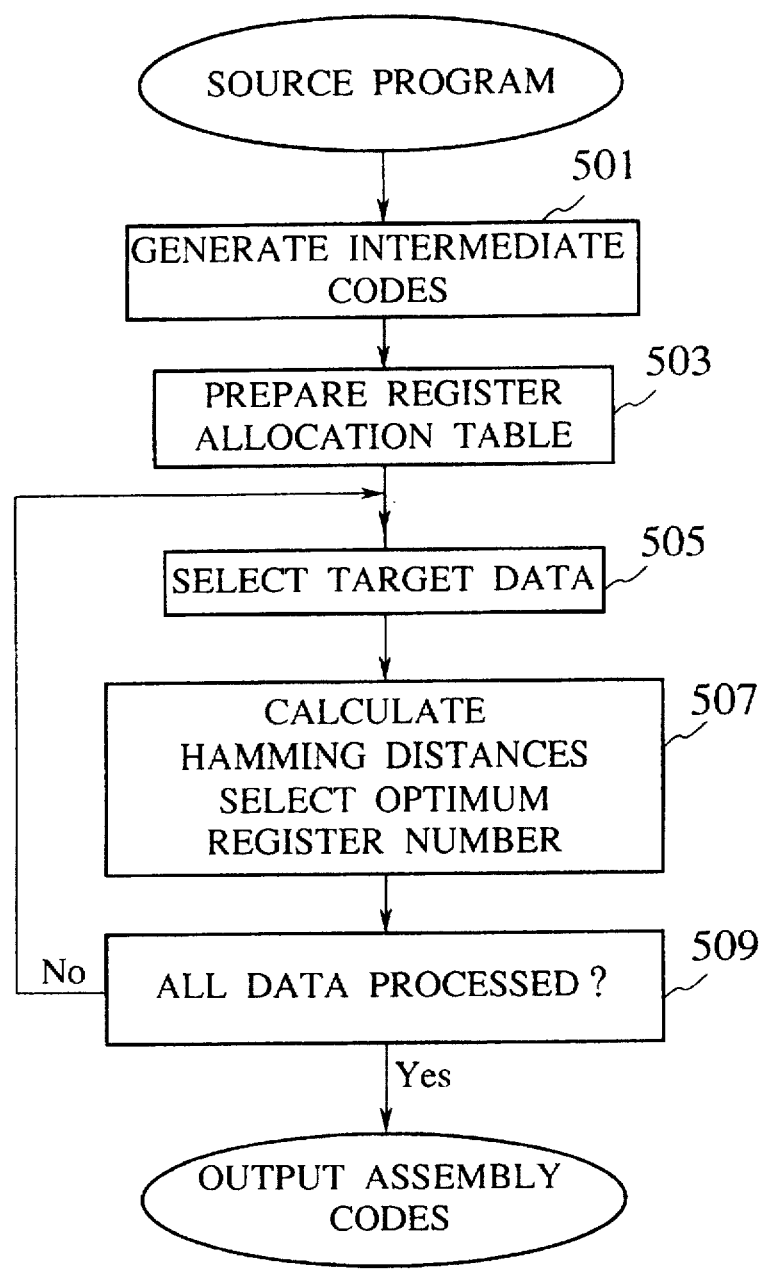
FIG. 19 is a flowchart illustrating procedures of optimization process effected by an instruction sequence optimization apparatus according to a second embodiment of the first present invention.

FIG. 19 is a flowchart for illustrating procedures for optimization process effected by the instruction sequence optimization apparatus of the second embodiment.

First, the source program prepared by the high-class language or the assembly language is compiled and then other optimization processes are executed, thus forming an intermediate code (assembly code) (step 501). An example of the program of the intermediate code obtained as above is shown in FIG. 20A.

Then, the register allocation table is prepared, and then an available range table is prepared from the register allocation table (step 503). The available range table for the program shown in FIG. 20A is shown in FIG. 21.

Subsequently, data to be focused in this check is selected (step 505), and then register numbers allocated to focused are replaced with register numbers which enable Hamming distances to be minimized (step 507). At this time, taking Hamming distances between instructions on the boundary of available ranges into consideration, optimization is effected so as to reduce Hamming distances on the boundary.

Assume that data allocated to the register number 0x1c is target data. It can be seen that the available range of data is recognized from the address 0101 to the address 1000 in the available range table in FIG. 21. In other words, only addresses 0101 to 1000 may be evaluated regarding such data. In the program shown in FIG. 20, new data is stored in the register number 0x1c by the instruction assigned to the address 1101, but is not evaluated since it is out of evaluation objects.

In the program in FIG. 20A, sum total of Hamming distances around the register number 0x1c becomes 14. Here, if other register number is looked for to minimize sum total of the Hamming distances, sum total of Hamming distances can become 8 by replacing the register number 0x1c with the register numbers 0, 2. Now, since the available ranges are overlapped on the register number 2, the register number 0x1c must be replaced with the register number 0. Thus, the program shown in FIG. 20B can be derived.

Subsequently, it is determined whether optimization of all data is completed or not (step 509) when replacement of the program is finished. In case data not optimized still remain, steps 505 to 509 are effected on the data. On the other hand, in case optimization of all data are completed, the program subject to optimization process is output, thus terminating optimization process.

According to the second embodiment, the control program optimized as described above is stored in the program memory of the information processing apparatus. By executing controls of CPU etc. by use of the control program, power consumption can be reduced on the instruction bus.

In the second embodiment, though a case wherein both the execution unit and the instruction bus are formed of 32 bit system has been explained by way of example, it is a matter of course that the second present invention can be applied to the case wherein addresses for a plurality of words are transferred simultaneously. For instance, if the addresses are transferred by four words boundary, Hamming distances between the instruction before the target instruction by four words and the instruction after the target instruction by four words may be evaluated.

Next, a third embodiment of the first present invention will be explained.

In the third embodiment, a case wherein the first present invention is applied to the "add" instruction will be explained as an example. When instruction function codes are prepared, the "add" instruction is "000000", for example, if the instruction function codes of SPARC are referred to. But, since the "add" instruction etc. have very high appearing frequency, the instruction system is so prepared that "111111" in addition to "000000" can be used as the "add" instruction in the third embodiment. In other words, in the information processing apparatus employing the control program optimized by the instruction sequence optimization apparatus of the third embodiment, the instruction decoder of the CPU is constructed so as to decode "000000" and "111111" as the "add" instruction. Thus, the compiler can allocate either of "000000" and "111111" to the instruction function code field when the object code is prepared. When the instruction function code fields of the instructions before and after the "add" instruction are "001110" and "110110", Hamming distance is 7 if "000000" is selected as the instruction function code of the "add" instruction whereas Hamming distance is 5 if "111111"0 is selected as the instruction function code of the "add" instruction. Consequently, in this case, the compiler selects "111111" as the instruction function code of the "add" instruction.

Subsequently, a concrete example of the instruction sequence optimization apparatus of the third embodiment will be explained with reference to FIGS. 22 and 23.

Figure 22:
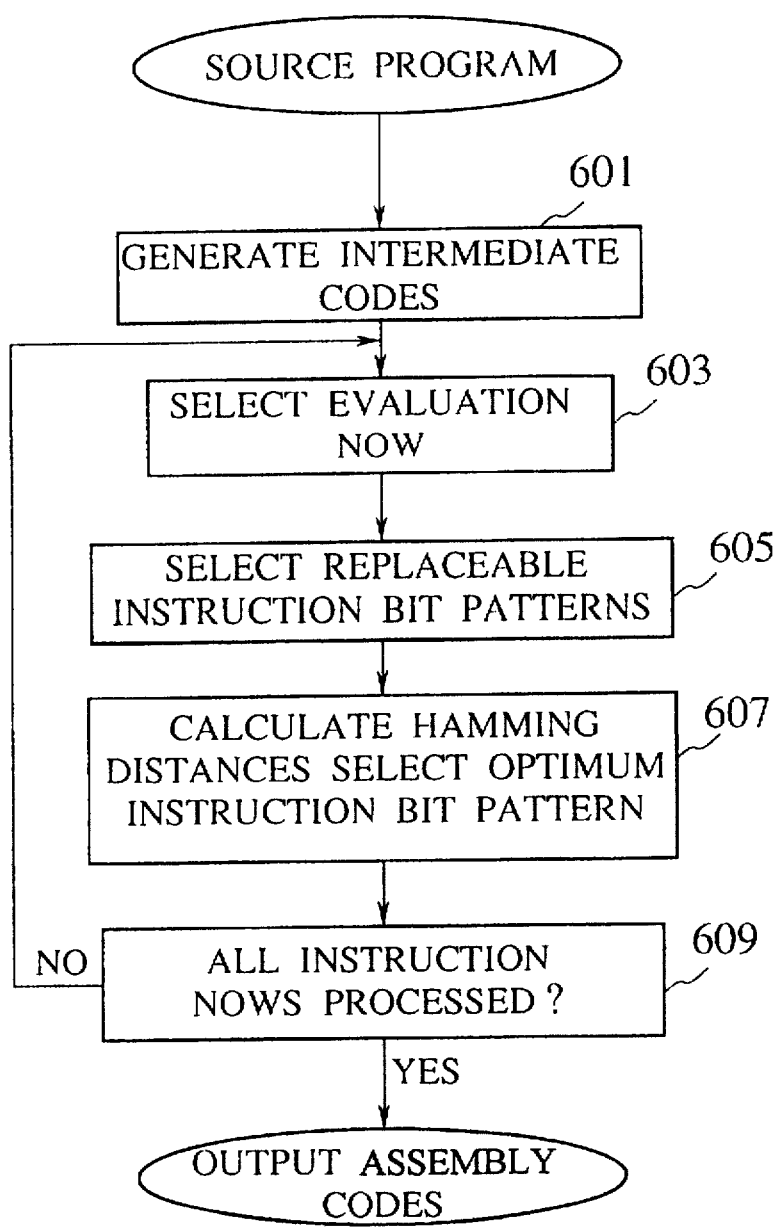
FIG. 22 is a flowchart illustrating procedures of optimization process effected by an instruction sequence optimization apparatus according to a third embodiment of the first present invention.

FIG. 22 is a flowchart illustrating procedures of optimization process executed by the instruction sequence optimization apparatus of the third embodiment.

First, intermediate codes (assembly codes) are prepared by compiling the source program made by the high-class language or the assembly language, and then executing other optimization processes (step 601). At this time, the instruction function code of the "add" instruction becomes "000000".

Next, it is determined whether or not respective instructions correspond to instructions to which the third embodiment is applied, i.e., instructions (the "add" instructions here) to which a plurality of instruction function code fields are allocated (step 603).

Then, if it is determined that the third embodiment is applied to the instructions, replaceable bit patterns ("111111" here) are selected for the instructions (step 605).

In addition, regarding to all bit patterns corresponding to the instruction, Hamming distances between the instruction and preceding/succeeding instructions are calculated, and the bit patterns to minimize their Hamming distances are selected by comparing with each other (step 607). FIG. 23 shows an example of the program in which optimization process of the "add" instruction is done. In this example, in the precedingly appeared "add" instruction, since Hamming distance is small if the instruction function code is set to "000000", replacement is not effected. In the succeedingly appeared "add" instruction, since Hamming distance is small if the instruction function code is set to "111111", replacement is effected.

Subsequently, if the replacement of the program is completed, it is determined whether optimization of all data is completed or not (step 609). If some data remain in which optimization is not finished, steps 605 to 609 are executed with respect to the data. On the other hand, if optimization of all data is finished, the program after optimization process is output. Then, optimization process is ended.

According to the third embodiment, the control program in which optimization is executed as stated above is stored in the program memory of the information processing apparatus. By controlling CPU etc. by means of the control program, power consumption on the instruction bus can be reduced.

Next, a fourth embodiment of the first present invention will be explained.

In the fourth embodiment, in case there are a plurality of achieving methods to perform one kind of operation, a certain instruction concerning the achieving methods is selected to minimize Hamming distances between the instruction and preceding/succeeding instructions. For example, when data "0" is written into the register 0x0d, the followings are listed as the achieving method if the register number 0, where writing thereinto is meaningless but reading therefrom outputs data "0", is defined as a special register like SPARC. By selecting the instruction to minimize Hamming distances between the concerned instruction and preceding/succeeding instructions, the instruction is replaced with proper one of these achieving methods (i.e., instructions).

mov r0, rd (instruction for shifting data "0" to 0x0d)

add r0, r0, rd (instruction for storing 0+0 in 0x0d)

mul r?, r0, rd (instruction for storing the value obtained by multiplying a certain value by 0 in 0x0d)

mul r0, r?, rd (instruction for storing the value obtained by multiplying o by a certain value in 0x0d)

xor r?, r?, rd (instruction for storing the result obtained by calculating an exclusive-OR of a certain value and the same value as the certain value in 0x0d)

sll r0, r?, rd (instruction for storing the value obtained by shifting 0 by a certain value to the right in 0x0d)

srl r0, r?, rd (instruction for storing the value obtained by shifting 0 by a certain value to the left in 0x0d)

Moreover, as other concrete example, there is an achieving method using immediate addition instruction. With respect to the immediate addition, immediate subtraction in which immediate portion is formed by two's–complement has the same arithmetic operation function as that of the immediate addition. For example, equations a=b+5 and a=b–(–5) are treated as the same arithmetic operation. If the immediate addition and the immediate subtraction are replaced with each other, there are some cases wherein Hamming distances can be reduced by replacing both equations with each other since instruction fields representing immediate data are inverted.

In the fourth embodiment, in order to select replaceable candidates, retrieval may be executed to check whether replaceable candidates are registered in the so-called library prepared in advance when certain instructions must be evaluated. As the result of the retrieval, if replaceable candidates can be retrieved, Hamming distances obtained in both replaced case and existing case are compared with each other. Further, in order to replace the immediate addition and the immediate subtraction mutually, the immediate subtraction may be registered as the replaceable candidates for the immediate addition in the library. At this time, if schemes or procedures for converting immediate data are also registered in the library, conversion schemes or procedures can also be derived at the same time when the immediate subtraction is retrieved. For instance, such procedures may be adopted that the instruction field is replaced with the immediate subtraction and also immediate data is replaced with two's–interpolation data. Data obtained by the above procedures are adopted as the compared object of Hamming distances. Besides, instead of mere retrieval of the library, such retrieval may be executed if retrieval is available after it is determined whether retrieval is available or not.

Next, a concrete example of the instruction sequence optimization apparatus of the fourth embodiment will be explained with reference to FIGS. 24 to 25.

Figure 24:
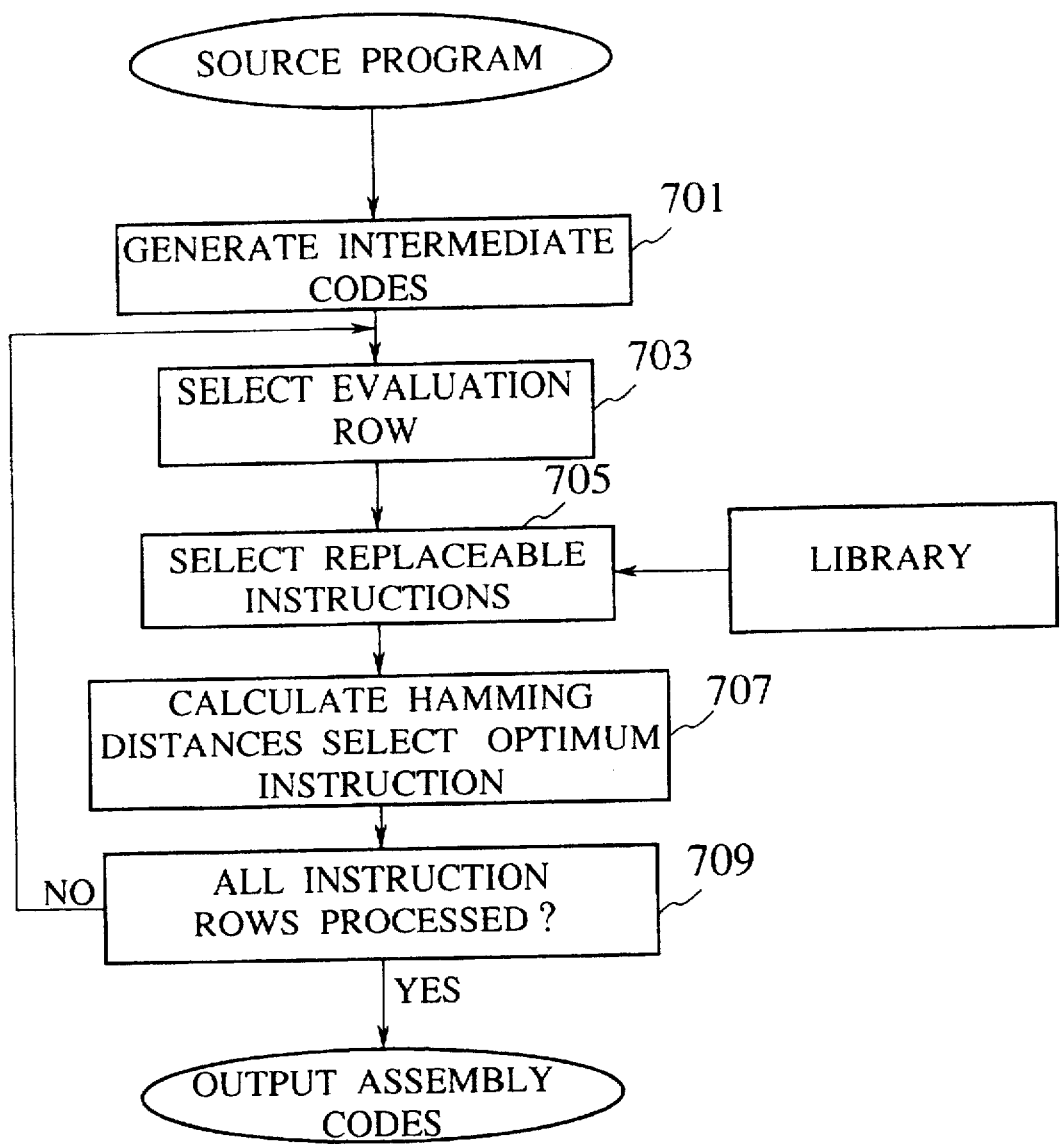
FIG. 24 is a flowchart illustrating procedures of optimization process effected by an instruction sequence optimization apparatus according to a fourth embodiment of the first present invention.

FIG. 24 is a flowchart for illustrating procedures of optimization process performed by the instruction sequence optimization apparatus of the fourth embodiment.

First, intermediate codes (assembly codes) are prepared by compiling the source program prepared by the high-class language or the assembly language, and then executing other optimization processes (step 701).

Next, it is determined whether or not respective instructions correspond to instructions to which the third embodiment is applied, i.e., instructions whose replace candidates are registered in the library (step 703).

Then, if it is determined that the third embodiment is applied to the instructions, replaceable instructions are selected by retrieving the library (step 705). Otherwise, at this time, the same instruction may be generated by analyzing instructed operation.

In addition, regarding the instructions to which the present embodiment is applied and the instructions retrieved from the library, Hamming distances between the instruction and preceding/succeeding instructions are calculated, and the bit patterns to minimize their Hamming distances are selected by comparing with each other (step 707). FIG. 25A shows an example of the program before optimization process by the present embodiment is done therein. FIG. 25B shows an example of the program after optimization process by the present embodiment is done therein. In FIGS. 25A and 25B, Hamming distances between the instruction and preceding/succeeding instructions can be reduced from 26 to 20 by replacing "addi" instruction (immediate addition instruction) with "subi" instruction (immediate subtraction instruction).

Subsequently, if the replacement of the instructions is completed, it is determined whether optimization of all data is completed or not (step 709). If some data remain in which optimization is not finished, steps 705 to 709 are executed with respect to the data. On the other hand, if optimization of all data is finished, the program after optimization process is output. Then, optimization process is ended.

According to the fourth embodiment, the control program in which optimization is executed as stated above is stored in the program memory of the information processing apparatus. By controlling CPU etc. by means of the control program, power consumption on the instruction bus can be reduced.

Next, a fifth embodiment of the first present invention will be explained.

In the fifth embodiment, in case there are a plurality of achieving methods to perform one kind of operation, a certain instruction concerning the achieving methods is replaced to decrease sizes of operating function blocks and reduce power consumption. In other words, while considering variation in data lines, power consumption in used function blocks etc., the instruction is replaced so as to minimize total power consumption. As the replacing method, the library may be used, which is similar to the above fourth embodiment. For instance, if the data "0" is written into the register 0x0d, the relations between adopted instructions and used function blocks are shown in Table 1. By selecting the instruction to minimize power consumption among theses instructions, the instruction is replaced with concerned one of these instructions.

TABLE 1

| instruction | | | used function block |
|---|---|---|---|
| mov | r0, | rd | bypass circuit |
| add | r0, r0, | rd | adder |
| mul | r?, r0, | rd | multiplier |
| mul | r0, r?, | rd | multiplier |
| xor | r?, r?, | rd | logic circuit |
| sll | r0, r?, | rd | barrel shifter |
| srl | r0, r?, | rd | barrel shifter |

Next, a concrete example of the instruction sequence optimization apparatus of the fifth embodiment will be explained with reference to FIG. 26.

Figure 26:
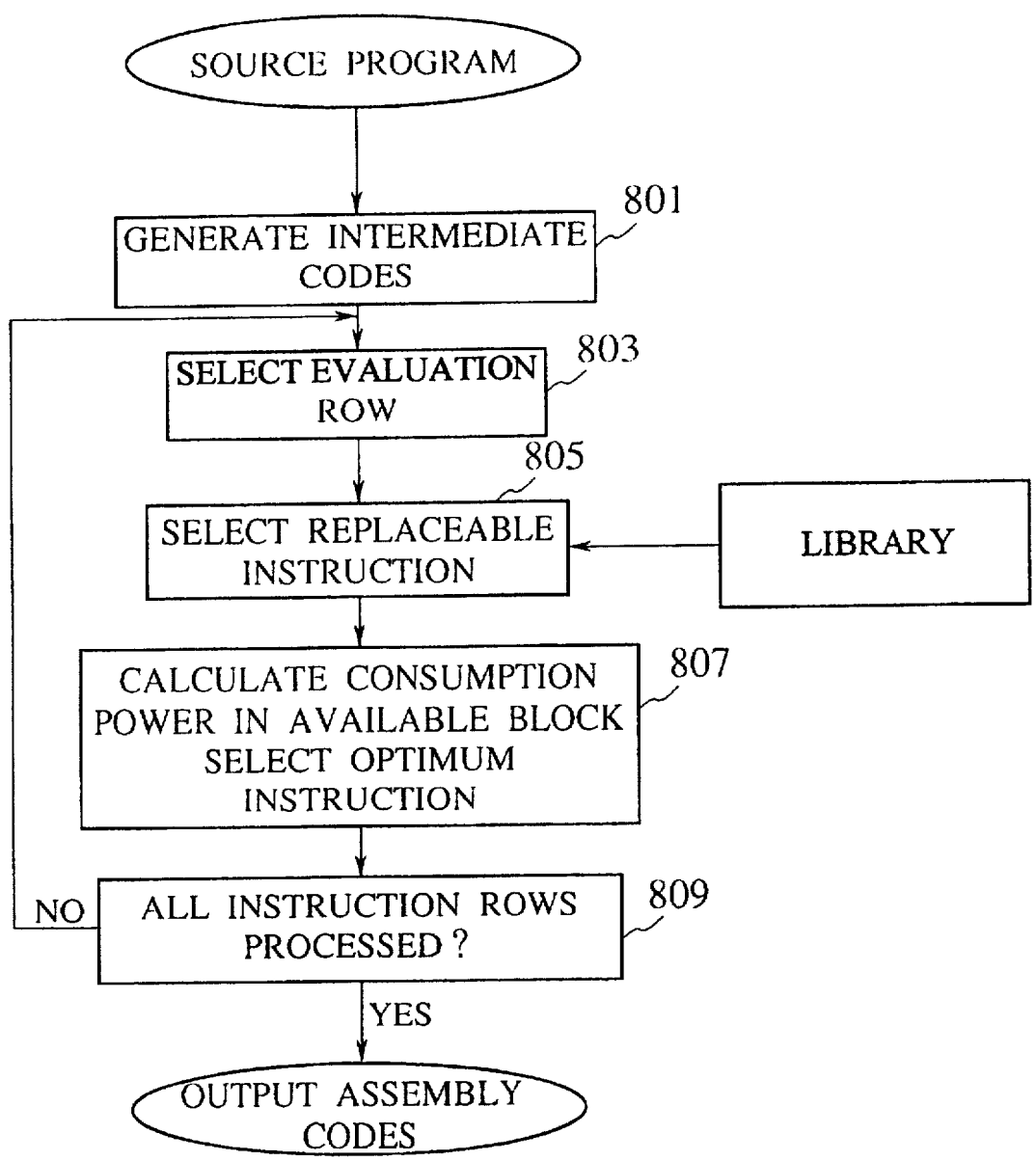
FIG. 26 is a flowchart illustrating procedures of optimization process effected by an instruction sequence optimization apparatus according to a fifth embodiment of the first present invention.

FIG. 26 is a flowchart illustrating procedures of optimization process executed by the instruction sequence optimization apparatus of the fifth embodiment.

First, intermediate codes (assembly codes) are prepared by compiling the source program made by the high-class language or the assembly language, and then executing other optimization processes (step 801).

Next, it is determined whether or not respective instructions correspond to instructions to which the third embodiment is applied, i.e., instructions whose replace candidates are registered in the library (step 803).

Then, if it is determined that the fifth embodiment is applied to the instructions, replaceable instructions are selected by retrieving the library (step 805). Otherwise, at this time, the same instruction may be generated by analyzing instructed operation.

In addition, regarding to the instructions to which the present embodiment is applied and the instructions retrieved from the library, power consumption is calculated. And, the instructions to minimize power consumption are selected by comparing respective calculation results with each other (step 807).

Subsequently, if the replacement of the program is completed, it is determined whether optimization of all data is completed or not (step 809). If some data remain in which optimization is not finished, steps 805 to 809 are executed with respect to the data. On the other hand, if optimization of all data is finished, the program after optimization process is output. Then, optimization process is ended.

According to the fifth embodiment, the control program in which optimization is executed as stated above is stored in the program memory of the information processing apparatus. By controlling CPU etc. by means of the control program, power consumption on the instruction bus can be reduced.

Subsequently, an information processing apparatus according to a first embodiment of a second present invention will be explained.

In the explanations, the same references denote the same constituent elements, and therefore their redundant explanations are omitted. Now, as a hardware configuration provided in the information processing apparatus according to the second present invention, a computer system may be used which includes a processor for performing various processes, an input device such as keyboard, mouse, write pen, flexible disk device or the like, an external memory device such as memory device, disk device or the like, and an output device such as display device, printer device or the like. The processor includes an instruction execution section for performing various processes, and an instruction decoder section for performing decoding operation of the instruction in the processes.

Figure 27:
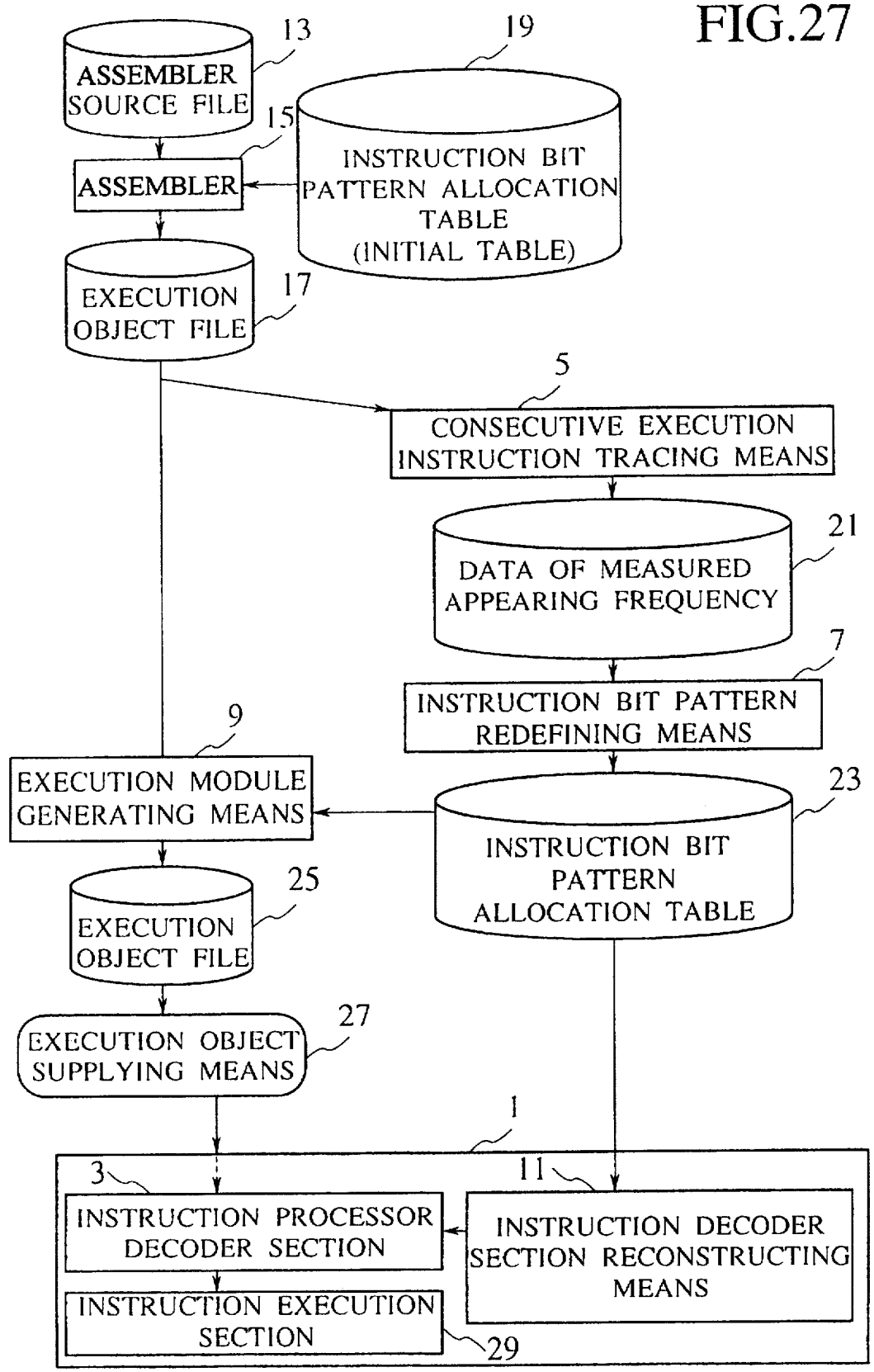
FIG. 27 is a block diagram showing a configuration of an information processing apparatus according to a first embodiment of a second present invention.

FIG. 27 shows a configuration of the information processing apparatus according to the first embodiment of the second present invention. In the first embodiment, the explanations are proceeded using the instruction set defined in the above literature, but are not limited to such instruction set. First, a configuration of the information processing apparatus will be explained. The information processing apparatus includes a processor 1 for performing instructions. The processor 1 has an instruction decoder section 3 for enabling reconstruction of corresponding relations between input bit patterns and control signals corresponding to said input bit patterns. In addition, the information processing apparatus comprises a consecutive execution instruction tracing section 5 which receives instruction code sequences to be executed by the processor, then measures appearing frequency of sets of consecutive execution instructions, which are consisted of a plurality of instruction codes to be executed continuously among the instruction code sequences, from a start of the instruction code sequences to an end of the instruction code sequences, and then outputs measured results; an instruction bit pattern redefining section 7 which receives the measured results output from the consecutive execution instruction tracing section 5, and redefines respective bit patterns of the instruction codes used in the instruction code sequences such that the number of changed bits in the bit patterns of the instruction codes is minimized particularly in the sets of consecutive execution instructions having higher appearing frequency, or redefines respective bit patterns of part of the instruction codes used in the instruction code sequences such that the number of changed bits in the bit patterns of part of the instruction codes is minimized particularly in the sets of consecutive execution instructions having higher appearing frequency; an execution module generating section 9 which generates execution modules executed in the processor 1 correspondingly to outputs from the instruction bit pattern redefining section 7 in respect of the bit patterns of respective instruction codes in the instruction code sequences; and an instruction decoder reconstructing section 11 which reconstructs the instruction decoder section 3 to respond to output of the instruction bit pattern redefining section 7.

Next, an operation of the information processing apparatus will be explained with reference to FIG. 27. An assembler source file 13 is assembled by the conventional assembler 15 to generate an execution object file 17. At this time, the assembler 15 refers to respective instruction fields of instruction sets incorporated therein and an instruction bit pattern allocation table 19 which provides correspondence between respective instruction fields and their bit patterns. In the present embodiment, the bit patterns which are defined in the above literature are referred to. The execution object file 17 generated is input first into the consecutive execution instruction tracing section 5. In the present embodiment, the consecutive execution instruction tracing section 5 and the instruction bit pattern redefining section 7 described later treat only the op 3 fields as the objects.

Figure 29:
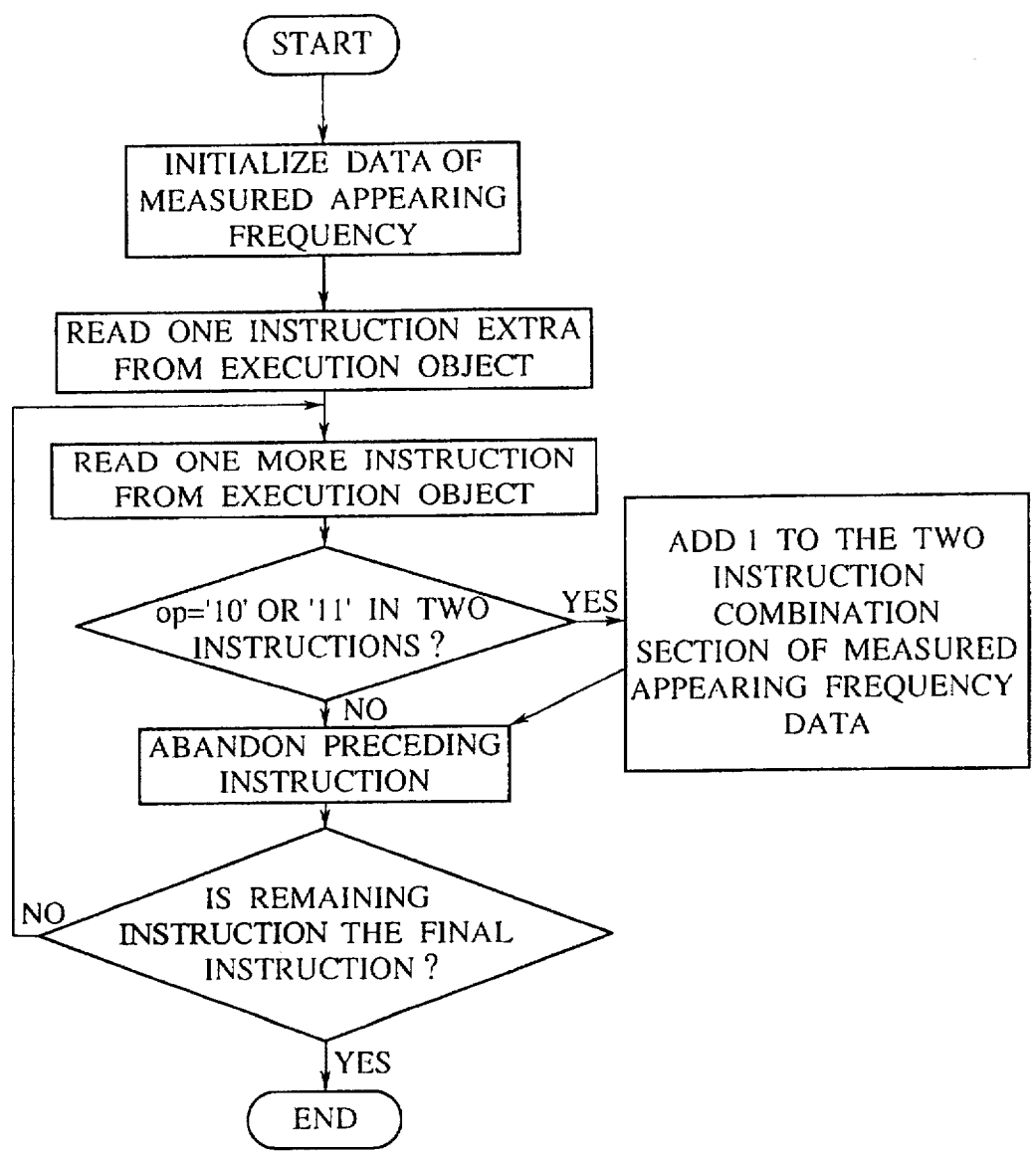
FIG. 29 is a flowchart illustrating an example of process effected by a consecutive execution instruction trace means.

Now, the consecutive execution instruction tracing section 5 is formed as the program that has the execution object file 17 as an input and measured data 21 of the appearing frequency which is arrangement data to store the appearing frequency of respective sets of two instructions as an output. For example, in the case of the assembler source program shown in FIG. 28A, op and op 3 fields of respective instructions of assembled bit sequences are shown in FIG. 28B. If both the op fields of two consecutive instructions are '10' or '11', the appearing frequency of respective sets of two instructions of the op 3 fields is execution-traced. The consecutive execution instruction tracing section 5 can be achieved by either dynamic execution trace as described or static execution trace. As its algorithm is shown in FIG. 29, the consecutive execution instruction tracing section 5 can be achieved by the program which searches the execution object file 17 sequentially from the beginning in execution order, adds "1" to the array element which has subscript showing the set of the consecutive instructions when '10' or '11' appears in both op fields of consecutive instructions, and executes the above procedures until the end of the execution object file 17. FIG. 30 shows measured data 21 of appearing frequency derived by the consecutive execution instruction tracing section 5. Here a combination of the smul instruction and the add instruction can be attained by two ways, i.e., (3)→(4) and (10)→(3) as shown in FIG. 28A, and thus their sum is regarded as the appearing frequency. Not sequences but combinations are counted for the appearing frequency.

As described above, the consecutive execution instruction tracing section 5 is formed as the program. However, the execution tracing portion can be formed by an emulator, a customized hardware, a general purpose processor having supplemented hardware, etc.

The instruction bit pattern redefining section 7 may be formed by the program which has measured data 21 of appearing frequency as an input and the instruction bit pattern allocation table 23 as an output. In the above example, the instruction bit pattern redefining section 7 prepares the instruction bit pattern allocation table 23 including bit pattern allocation shown in FIG. 31, for example. Since the instructions not shown in FIG. 31 among the instructions having the op 3 fields are not required in the environment for the execution program, modification of bit patterns in the op 3 fields are not needed.

In the present embodiment, the instruction bit pattern redefining section 7 allocates bit patterns which minimize the evaluation function,

| Σ | (appearing frequency of sets of two instructions) |
|---|---|
| instruction | * |
| used | (changed bit number of op 3 fields between two instructions) | to respective instructions having the op 3 fields used in program execution. In general, several algorithms to solve the optimization problems having the clear evaluation function have been known, and therefore their detailed explanations are omitted.

Figures 31, 32:
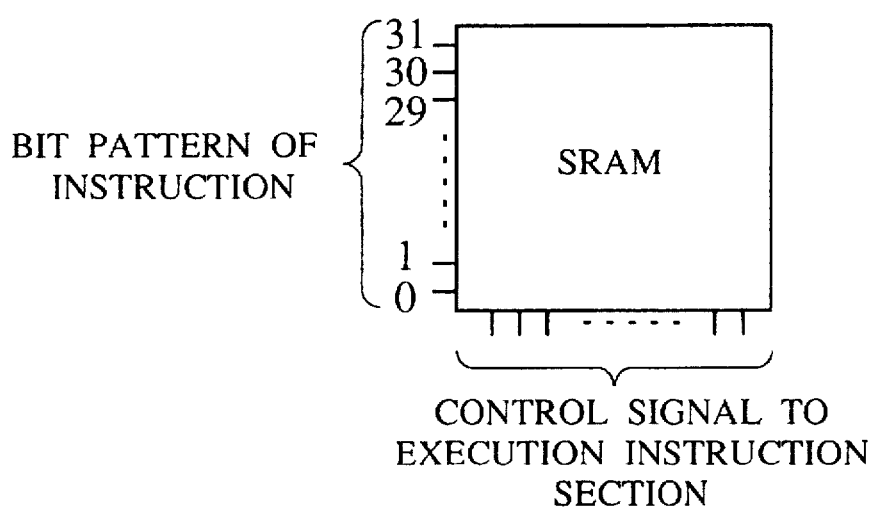
FIG. 31 is a table showing modified examples of bit patterns of respective instructions.
FIG. 32 is a view showing a configuration of an SRAM as an example of an instruction decoder section.

FIG. 31 shows the contents of the instruction bit pattern allocation table 23 which is redefined by the instruction bit pattern redefining section 7 described above. In the instruction bit pattern allocation table 23, there are seven instructions which are combined with the add instructions among used instructions. While, since the op 3 fields have mere 6 bits, the bit patterns shifted by two bits from the add instruction are allocated to the instruction sub or sdiv having the least appearing frequency. Since either sub or sdiv does not change the value of the evaluation function, any instruction may be selected as two bit change. This problem depends on the concrete assemble of the consecutive execution instruction tracing section 5 and the instruction bit pattern redefining section 7. Similarly, it depends on the concrete assemble of the instruction bit pattern redefining section 7 that which two combination of add-xor, xor-and, and-add instructions may be used as one bit change.

The execution module generating section 9 can be formed by the filter program which converts the op 3 fields of respective instructions in the execution object file 25 in accordance with the instruction bit pattern allocation table 23.

The execution object supplying section 27 means an apparatus or a program which loads the execution object file 17 to the memory attached to the processor 1 to supply to the instruction decoder section 3 in the processor 1. But, the conventional device may be used as it is. For instance, it is supplied as ROM, or it is placed in the memory by the loader program in the operating system which is mounted on the computer system including the processor 1. In both cases, the instruction is fetched from the external memory device such as the memory device, and supplied to the instruction decoder section 3.

The instruction decoder section 3 itself is formed by a reconstructible element, for example, SRAM, EPROM, PLD, FPGA, gate array or the like. However, the gate array can be reconstructed only once from initial state where no logic is incorporated into the device. Areas are fixed other than instruction fields for which bit pattern redefinition of the instructions are required. For example, it can be formed in a hard wired fashion.

On the other hand, in the present embodiment, the instruction decoder section reconstructing section 11 in the processor maps the instruction bit pattern allocation table 23 on the instruction decoder section 3 such that the processor 1 can be operated according to the instruction bit pattern allocation table 23. For instance, in the present embodiment, the instruction decoder section 3 may be formed by the SRAM using the 32 bit pattern of the instruction as the address, as shown in FIG. 32. Further, in the present embodiment, the instruction decoder section reconstructing section 11 is a loader for loading data as the output control signal into SRAM. In the operation of the instruction decoder section 3, if the thirty-first and the thirtieth bits of the bit patterns in the op field of the instruction is '10' or '11', data may be written in advance such that the control signal to execute the instruction in FIG. 31 is sent to the instruction execution section 29 according to the six bits in which the bit pattern of the instruction is redefined, i.e., according to the bit pattern from the twenty-fourth to the nineteenth bits of the instruction. The instruction decoder section reconstructing section 11 executes this writing operation. In other cases, the instruction decoder section reconstructing section 11 write data into SRAM in the instruction decoder section 3 previously such that the control signal is sent to the instruction execution section so as to execute the instruction as stated in the above literature. In addition, if the instruction decoder section 3 is formed by EPROM, the instruction decoder section reconstructing section 11 may be formed by EPROM writer.

As above, the processor 1 can convert bit patterns of respective instructions in the instruction sequence according to the program to be executed, without modifying instruction sequences scheduled to attain high speed operation etc., and can execute control by reconstructing the instruction decoder section in the processor 1 so as to suppress power consumption due to bit changes on the instruction bus and to reduce the cost.

Figure 33:
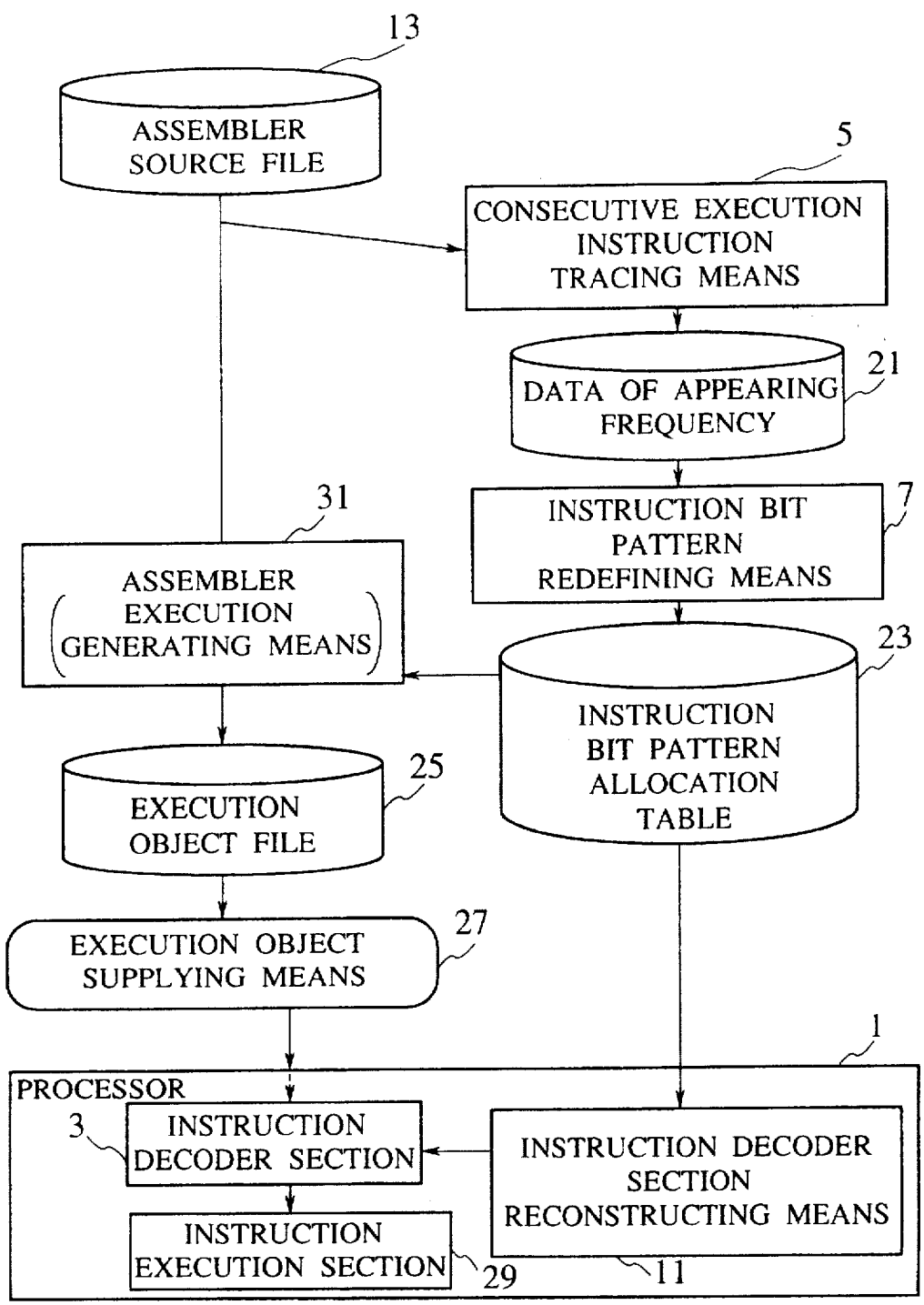
FIG. 33 is a block diagram showing a configuration of an information processing apparatus according to a second embodiment of the second present invention.

Next, a second embodiment of the second present invention will be explained with reference to FIG. 33. In the embodiment in FIG. 33, the consecutive execution instruction tracing section 5 uses as its input the assembler source file 13 as it is in place of the file formed in execution object file format. In this embodiment, the consecutive execution instruction tracing section 5 does not use bit data to trace executions of the instruction sequences, but effects the trace of the execution by interpreting respective assembler instructions in the assembler source file originally.

Furthermore, in the present embodiment, the assembler is used both as the execution module generating section 9 and the assembler 31. In other words, if the instruction bit pattern allocation table which is referred by the assembler 15 of the ordinary structure is modified, the assembler 15 can be used as the execution module generating section 9.

Figure 34:
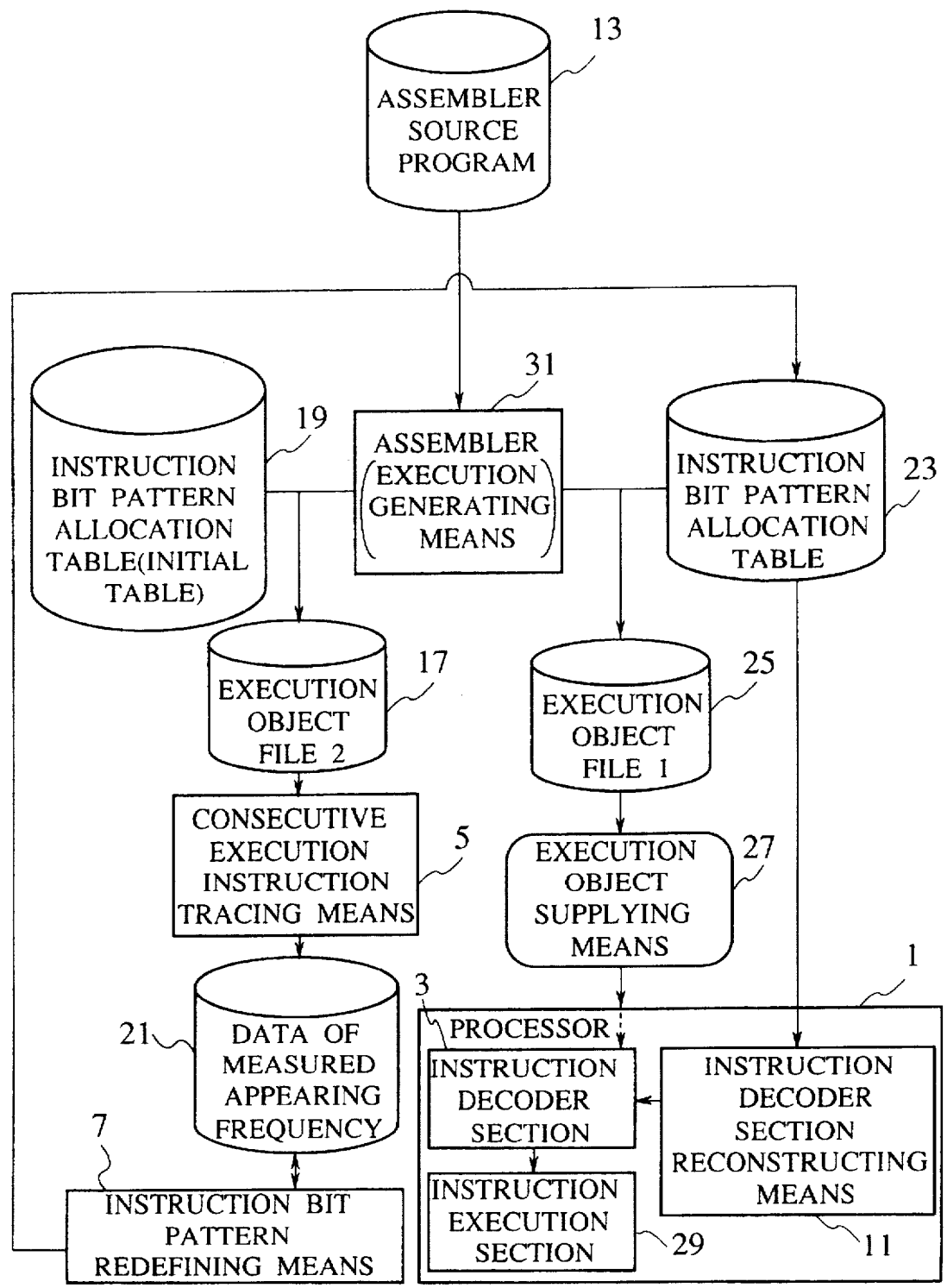
FIG. 34 is a block diagram showing a configuration of an information processing apparatus according to a third embodiment of the second present invention.

Next, a third embodiment of the second present invention will be explained with reference to FIG. 34. In the embodiment in FIG. 34, while using the assembler 31 which is used as the execution module generating section 9 described in FIG. 33, the files formed in execution object file format are used as the input of the consecutive execution instruction tracing section 5.

In the above embodiments, three configurations have been explained, and instruction sets defined in the above literature and processors for executing the instructions have been exemplified, and focused to reduce which are focused to reduce power consumption have been discussed with taking the op 3 fields described in the above literature as an example. However, the second present invention is also available for other part of the bit pattern of the concerned instruction set, other instruction sets, and other processor configuration, i.e. other machine such as super scalar, super pipeline, or VLIW machine, for example, which adopts parallel processing enabling plural instructions to be executed simultaneously or in duplicate partially.

In the machine for handling the parallel processing, there is a possibility that a plurality of instruction buses are provided. As a result, there are some cases wherein consecutive instructions are not always fetched on the same instruction bus even if they are continuous as the instruction codes. In this case, sets of two instructions which are fetched continuously on the same instruction bus may be regarded as instruction sets, and their appearing frequency may be traced upon execution. In addition, although the instruction sets are limited to consecutive two instructions in the present embodiment, the same advantage can be attained in the case of other plural consecutive number instructions such as consecutive three instructions, consecutive four instructions, consecutive five instructions, or the like. The reason is that, since the evaluation functions can be expressed respectively as an integral multiple of the evaluation function for the two instructions if other plural consecutive instructions of the evaluation function are prepared, the completely same advantages can be achieved as the result.

According to the second present invention, because low power consumption has been achieved in both hardware and software sides, low power consumption can be accomplished according to execution application programs on the instruction bus, without modification of the instruction code sequences in which instruction scheduling has been conducted to enhance an operation speed. In addition, by designing the hardware such that only the instruction decoder section can be modified, the instruction decoder section may be varied merely as the modified portion in the hardware, and thus cost of the hardware can also be suppressed.

What is claimed is:

1. An instruction sequence optimization apparatus which optimizes programs used in an information processing apparatus having a program memory for storing said programs, and a processing unit for fetching said programs from said program memory via an instruction bus, comprising:

an instruction sequence analyzing means for analyzing mutual dependence relations between respective instructions constituting said program, an instruction sequence modifying means for modifying sequences of said instructions, insofar as said mutual dependence relations analyzed by said instruction sequence analyzing means are not influenced, to reduce Hamming distances between bit sequences appearing on said instruction bus when said instructions are transferred from said program memory to said processing unit, and a block dividing means for dividing said program into basic blocks to send said basic blocks to said instruction sequence analyzing means, wherein said instruction sequence modifying means executes an instruction order determination process in each of said basic blocks based on a Hamming distance between the last bit sequence in an immediately preceding basic block and the first bit sequence in a current basic block, wherein the first bit sequence in each of said basic blocks is taken into consideration in determining a minimum Hamming distance.

2. An instruction sequence optimization apparatus according to claim 1, wherein, if said instruction includes a bit sequence which is not considered when said program is executed by said processing unit, a signal value for said bit sequence is modified so as to reduce Hamming distances between said bit sequence and preceding/succeeding bit sequences.

3. An instruction sequence optimization apparatus which optimizes programs used in an information processing apparatus having a plurality of registers for storing data temporarily, a program memory for storing said programs, and a processing unit for writing/reading data into/from said registers based on instructions fetched from said program memory via an instruction bus, comprising:

a register number recognizing means for recognizing register numbers included in respective instructions constituting said programs, a register available range recognizing means for recognizing available ranges of said register numbers recognized by said register number recognizing means, and an instruction sequence modifying means for modifying said register numbers, insofar as said available ranges recognized by said register available range recognizing means are not influenced, to reduce Hamming distances between bit sequences appearing on said instruction bus when said instructions including said register numbers are transferred from said program memory to said processing unit.

4. An instruction sequence optimization apparatus according to claim 3, wherein said instruction sequence modifying means includes:
   a searching means for searching register numbers which are replaced with respective register numbers recognized by said register number recognizing means without affecting said available ranges recognized by said register number recognizing means,
   a selecting means for selecting a register number providing the smallest Hamming distance from said register numbers recognized by said register number recognizing means and said register numbers searched by said searching means, and
   a replacing means for replacing register number in said program with said register number selected by said selecting means.

5. An instruction sequence optimization apparatus which optimizes programs used in an information processing apparatus having a program memory for storing said programs, and a processing unit for fetching said programs from said program memory via an instruction bus, comprising:
   a storing means for storing different bit patterns indicating the same instructions which are formed of part or the whole of respective instructions constituting said programs, and
   an instruction sequence modifying means for replacing said instructions in said programs with bit patterns stored in said storing means to thus reduce Hamming distances between bit sequences appearing on said instruction bus when said instructions are transferred from said program memory to said processing unit.

6. An instruction sequence optimization apparatus which optimizes programs used in an information processing apparatus having a program memory for storing said programs, and a processing unit for fetching said programs from said program memory via an instruction bus, comprising:
   a selecting means for selecting other instruction or other instruction sequences which can result in the same processed results instead of instruction or instruction sequences included in said program, and
   an instruction sequence modifying means for replacing said instruction or said instruction sequences included in said program with said instruction or said instruction sequences selected by said selecting means to thus reduce Hamming distances between bit sequences appearing on said instruction bus when said instruction or said instruction sequences is or are transferred from said program memory to said processing unit.

7. An instruction sequence optimization apparatus which optimizes programs used in an information processing apparatus having a program memory for storing said programs, and a processing unit for fetching said programs from said program memory via an instruction bus, comprising:
   a selecting means for selecting other instruction or other instruction sequences which can result in the same processed results instead of instruction or instruction sequences included in said program,
   a processing means for calculating power consumption on said instruction bus caused due to said instruction or said instruction sequences included in said program and caused due to said instruction or said instruction sequences selected by said selecting means with considering Hamming distances between bit sequences when said instruction or said instruction sequences is or are transferred from said program memory to said processing unit, and an instruction sequence modifying means for replacing said instruction or said instruction sequences included in said program with said instruction or said instruction sequences selected by said selecting means to thus reduce consumption power calculated by said processing means.

8. An information processing apparatus comprising:
   a processor having an instruction decoder section for outputting control signals corresponding to input bit patterns, and a instruction executing section for executing instructions according to said control signal out from said instruction decoder section,
   wherein said instruction decoder section can modify corresponding relation between said bit patterns and said control signal according to frequency of combination of consecutive execution instructions to be consecutively executed by said processor.

9. An information processing apparatus according to claim 8, wherein said consecutive execution instruction is formed of two consecutive execution instructions.

10. An information processing apparatus including a processor having an instruction decoder section for outputting control signals corresponding to input bit patterns, and a instruction executing section for executing instructions according to said control signal out from said instruction decoder section, comprising:
   a consecutive execution instruction tracing means for receiving instruction code sequences to be executed by said processor, then measuring appearing frequency of sets of consecutive execution instructions, which include a plurality of instruction codes to be executed continuously among said instruction code sequences, from a start of the instruction code sequences to an end of the instruction code sequences, and then outputting measured results,
   an instruction bit pattern redefining means for receiving said measured results output from said consecutive execution instruction tracing means, and redefining respective bit patterns of said instruction codes used in said instruction code sequences such that the number of changed bits in the bit patterns of said instruction codes is minimized particularly in the sets of consecutive execution instructions having higher appearing frequency,
   an execution module generating means for generating execution modules executed in said processor correspondingly to outputs from said instruction bit pattern redefining means in respect of said bit patterns of respective instruction codes in said instruction code sequences, and
   an instruction decoder reconstructing means for reconstructing said instruction decoder section to respond to output of said instruction bit pattern redefining means.

11. An information processing apparatus according to claim 10, wherein said consecutive execution instruction tracing means receives instruction code sequences to be executed by said processor, measures respective appearing frequencies of said sets of consecutive execution instructions which include a plurality of instruction codes to be executed continuously among said instruction code sequences from heads of said instruction code sequences to ends of said instruction code sequences, and outputs measured results.

12. An information processing apparatus according to claim 10, wherein said instruction bit pattern redefining means redefines respective bit patterns of part of said instruction codes used in said instruction code sequences such that either the number of changed bits in said bit patterns between a plurality of said instruction codes constituting said sets of instructions or the number of changed bits in said bit patterns between part of a plurality of said instruction codes constituting said sets of instructions is minimized particularly in said sets of consecutive execution instructions having higher appearing frequency.

13. An information processing apparatus according to claim 10, wherein said instruction decoder section include a gate array.

14. A method of instruction sequence optimization for a program to be retrieved from a program memory via an instruction bus so as to be executed to a processor, the method comprising the steps of:

a) partitioning said program into basic blocks, each of said basic blocks having a beginning instruction and an ending instruction; and b) for each of said basic blocks, placing each instruction in said each of said basic blocks in a particular order so as to result in a minimum Hamming distance between bit sequences of adjacent instructions in each of said basic blocks, said minimum Hamming distance including a Hamming distance with respect to the ending instruction in a preceding one of said basic blocks and a beginning instruction in each of said basic blocks, wherein the placing of said each instruction in the step b) is only performed for particular instructions in each of said basic blocks that can be moved with respect to each other so as not to change a mutual dependence relationship between said particular instructions, and wherein the particular order is used to transfer each of said basic blocks over said instruction bus from said program memory to said processor.

15. A method of instruction sequence optimization according to claim 14, further comprising the step of:

c) determining if an operation field in any of said instructions in each of said basic blocks can be modified without affecting the corresponding instruction, and if so, changing a bit pattern in said operation field so as to minimize a Hamming distance with respect to an immediately preceding instruction and an immediately subsequent instruction in each of said basic blocks.

16. A method of instruction sequence optimization according to claim 14, further comprising the step of:

c) determining whether any of said instructions in each of said basic blocks can be performed by using a different instruction so as to achieve a same end result, and if so, choosing one of any of said instructions and said different instruction in each of said basic blocks so as to minimize a Hamming distance with respect to an immediately preceding instruction and an immediately subsequent instruction in each of said basic blocks.

* * * * *